(12) United States Patent
Rentschler et al.

(10) Patent No.: US 6,678,811 B2
(45) Date of Patent: Jan. 13, 2004

(54) MEMORY CONTROLLER WITH 1X/MX WRITE CAPABILITY

(75) Inventors: Eric M. Rentschler, Fort Collins, CO (US); Jeffrey G. Hargis, Fort Collins, CO (US); Leith L. Johnson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 09/827,768

(22) Filed: Apr. 7, 2001

(65) Prior Publication Data

US 2002/0147896 A1 Oct. 10, 2002

(51) Int. Cl.$^7$ ............................................... G06F 13/00
(52) U.S. Cl. ..................... 711/167; 711/105; 327/144; 713/501; 365/193; 365/194
(58) Field of Search ................... 711/167, 105, 711/154; 365/193, 194, 195, 233; 713/400, 500, 501, 502, 503, 600; 327/144

(56) References Cited

U.S. PATENT DOCUMENTS

| 5,418,924 | A | | 5/1995 | Dresser |
| 5,522,064 | A | * | 5/1996 | Aldereguia et al. .......... 713/501 |
| 5,701,438 | A | * | 12/1997 | Bains .......................... 711/211 |
| 5,727,005 | A | * | 3/1998 | Le et al. ...................... 714/814 |
| 6,005,412 | A | | 12/1999 | Ranjan et al. |
| 6,065,132 | A | * | 5/2000 | Takano ........................ 713/600 |
| 6,144,598 | A | * | 11/2000 | Cooper et al. ............... 365/201 |
| 6,288,971 | B1 | | 9/2001 | Kim |
| 6,324,119 | B1 | * | 11/2001 | Kim ............................ 365/233 |
| 6,370,630 | B1 | * | 4/2002 | Mizuyabu et al. .......... 711/167 |
| 6,424,198 | B1 | * | 7/2002 | Wolford ...................... 327/291 |
| 6,530,001 | B1 | * | 3/2003 | Lee ............................. 711/154 |
| 6,532,525 | B1 | * | 3/2003 | Aleksic et al. .............. 711/168 |
| 6,553,450 | B1 | * | 4/2003 | Dodd et al. ................. 711/105 |
| 2001/0003837 | A1 | * | 6/2001 | Norman et al. ................ 711/5 |
| 2001/0054135 | A1 | * | 12/2001 | Matsuda ...................... 711/167 |
| 2002/0147896 | A1 | * | 10/2002 | Rentschler et al. ......... 711/167 |
| 2002/0147898 | A1 | * | 10/2002 | Rentschler et al. ......... 711/170 |
| 2002/0172079 | A1 | * | 11/2002 | Hargis et al. ............... 365/193 |

FOREIGN PATENT DOCUMENTS

WO WO 99/04494 1/1999

OTHER PUBLICATIONS

"Preliminary Publication of JEDEC Semiconductor Memory Standards–DDR SDRAM Specification", Aug. 1999 (73 page).
JEDEC Standard No. 79, "Double Data Rate (DDR) SDRAM Specification", Jun. 2000 (72 pages).

* cited by examiner

Primary Examiner—Hong Kim

(57) ABSTRACT

Methods and apparatus for writing data to memory are disclosed herein. In general, the methods and apparatus provide a memory controller with means for writing data at different rates. Data may need to be written to memory at different rates because, for example, the memory controller is used in environments where it attaches directly to a number of memory modules, and/or in environments where it attaches to a number of memory modules via an intermediary chip. The intermediary chip may, for example, comprise demultiplexers which receive data from the memory controller at twice the rate which data could be written directly to a memory module. The intermediary chip may then simultaneously transmit the demultiplexed write data to memory modules in two or more banks of memory modules.

6 Claims, 23 Drawing Sheets

| STROBE PADS | | DATA PADS |
|---|---|---|
| x4 DIMM | x8 DIMM | |
| 0 | 0 | 3:0 |
| 18 | 0 | 7:4 |
| 1 | 1 | 11:8 |
| 19 | 1 | 15:12 |
| 2 | 2 | 19:16 |
| 20 | 2 | 23:20 |
| 3 | 3 | 27:24 |
| 21 | 3 | 31:28 |
| • | • | • |
| • | • | • |
| • | • | • |
| 16 | 16 | 131:128 |
| 34 | 16 | 135:132 |
| 17 | 17 | 139:136 |
| 35 | 17 | 143:140 |

MEMORY CONTROLLER WITH 1X/MX WRITE CAPABILITY

FIELD OF THE INVENTION

The invention pertains to the field of memory controllers.

BACKGROUND OF THE INVENTION

The purpose of a memory controller is to field and execute memory access requests (i.e., requests to read data from, and write data to, a number of memory modules). A memory access request is typically initiated by a central processing unit (CPU), but one may also be initiated by an input/output device (I/O device).

In the past, most memory controllers have been designed to access memory modules which are read and written via common clock data transmissions. That is, data bits are transmitted between a memory controller and a number of memory modules in sync with the rising edges of the memory controller's internal clock. However, there is a current push to design memory controllers which are capable of accessing double data rate (DDR) memory modules.

A DDR memory module is one which is read and written via source synchronous data transmissions. That is, data bits are transmitted between a memory controller and a number of memory modules in sync with the rising and falling edges of a strobe, with the strobe being generated by the component which sources the data. The strobe is then used by the component which receives the data for the purpose of capturing the data. Thus, a strobe is transmitted by the memory controller during a write operation, and a strobe is transmitted by a memory module during a read operation.

SUMMARY OF THE INVENTION

As is known by those skilled in the art, the complexity of memory controllers makes them very expensive components to design, develop and verify. The inventors therefore provide below a description of a memory controller having a greater number of functional modes. By providing a memory controller with a greater number of functional modes, an application specific integrated circuit (ASIC) manufacturer can satisfy a greater number of computing applications with a single memory controller, and thus save time and expense by designing, developing and verifying a fewer number of memory controllers. From a computer manufacturing perspective, the use of a common memory controller in a variety of computer systems enables machine dependent code, printed circuit board design, et cetera to be leveraged from one computer system to the next.

In accordance with the invention, new methods and apparatus pertaining to memory controllers are disclosed herein. A portion of the methods and apparatus pertain to a memory controller's write of data to a number of memory modules.

In general, the methods and apparatus provide a memory controller with means for writing data at different rates. Data may need to be written to memory at different rates because, for example, the memory controller is used in environments where it attaches directly to a number of memory modules, and/or in environments where it attaches to a number of memory modules via an intermediary chip. The intermediary chip may, for example, comprise demultiplexers which receive data from the memory controller at twice the rate which data could be written directly to a memory module. The intermediary chip may then simultaneously transmit the demultiplexed write data to memory modules in two or more banks of memory modules.

Although the invention is not limited to DDR environments, one embodiment of the invention provides a double data rate memory controller which comprises a means for writing data and generating strobe signals at 1x double data rate memory speed, and a means for writing data and generating strobe signals at Mx double data rate memory speed (where $M \geq 2$ and x is a baseline rate at which data is written to a memory module).

Another embodiment of the invention provides memory controller driver circuitry with a data pad (which pad may form part of an interface comprising a plurality of data pads) and N data propagation circuits (where $N \geq 2$). A multiplexing stage provides data to at least N−1 of the N data propagation circuits. The multiplexing stage enables a coupling of a first data input stream to each of the N data propagation circuits when the multiplexing stage is configured in a 1x mode, and enables a coupling of different data input streams to various of the N data propagation circuits when the multiplexing stage is configured in an Mx mode ($1<M \leq N$). Output merging circuitry alternately couples the N data propagation circuits to the data pad to thereby generate either a 1x or Mx stream of data bits at the data pad.

A third embodiment of the invention provides a method for driving data from a memory controller. The method commences with providing data pad driver circuitry of the memory controller with a first data stream when the memory controller is configured to operate in a 1x mode, and providing the data pad driver circuitry with N−1 additional data streams when the memory controller is configured to operate in an Nx mode ($N \geq 2$). The data pad driver circuitry is then clocked at an Nx rate to thereby 1) generate a 1x data stream at a data pad of the memory controller when the memory controller is configured to operate in 1x mode, and 2) generate an Nx data stream at the data pad when the memory controller is configured to operate in Nx mode.

One advantage of the memory controller and driver circuitry disclosed herein is that it adapts to driving 1x or Mx (e.g., 2x) data using relatively simple hardware. By providing a memory controller that can write data in 1x and Mx modes, a more universal memory controller may be manufactured, thus scaling to increase the range of market segments covered by the memory controller with only a minimal increase in manufacturing costs.

Another advantage of the disclosed circuitry is that it can scale to support higher bandwidth and higher capacity computer systems.

The important advantages and objectives of the above and other embodiments of the invention will be further explained in, or will become apparent from, the accompanying description, drawings and claims.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
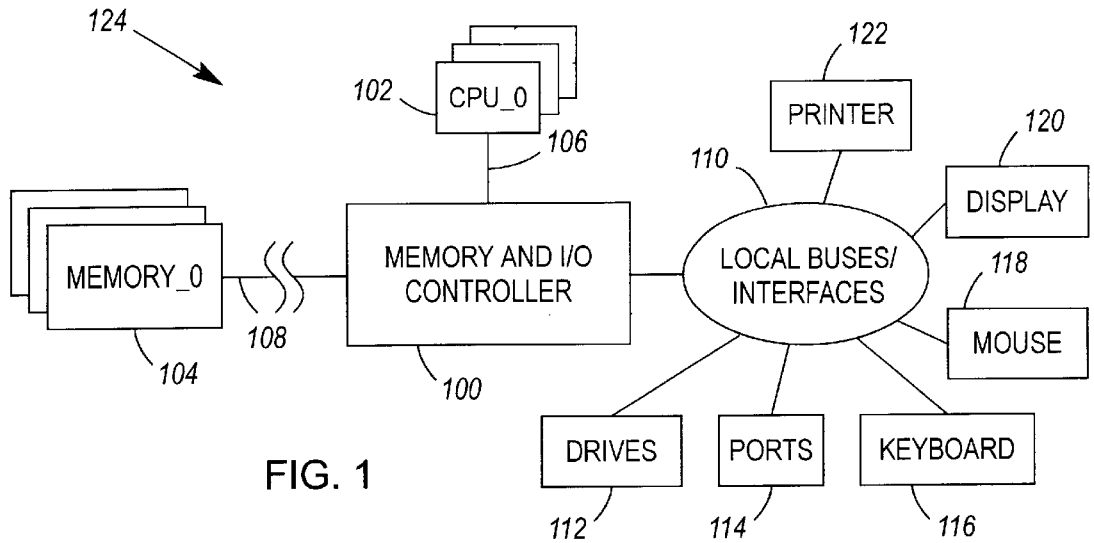
FIG. 1 illustrates a computer system.
Figure 2:
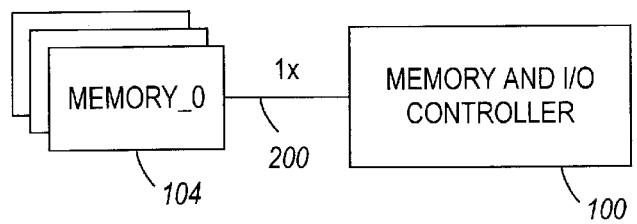
FIG. 2 illustrates a first exemplary embodiment of FIG. 1's memory controller, wherein the memory controller is directly attached to a plurality of memory modules for the purpose of data transmissions in a 1x mode.
Figure 3:
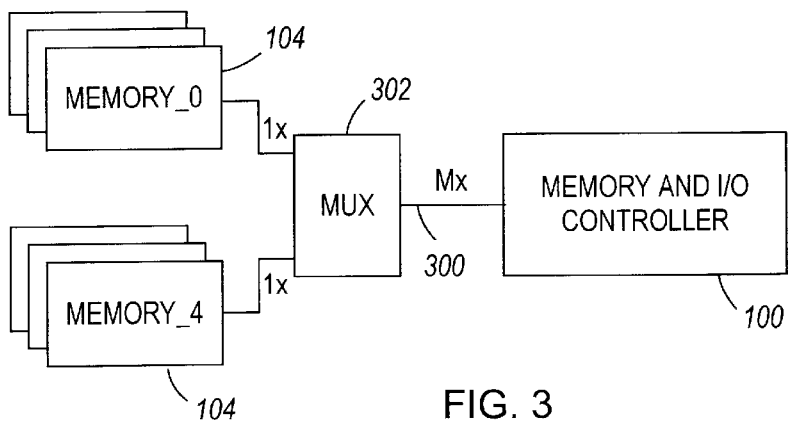
FIG. 3 illustrates a second exemplary embodiment of FIG. 1's memory controller, wherein the memory controller is attached to a plurality of memory modules via an intermediary chip for the purpose of data transmissions in a 2x mode.

1. In General: a Memory Controller with a Greater Number of Functional Modes A memory controller 100 with a greater number of functional modes is illustrated in FIGS. 1–3. The memory controller 100 is preferably a double data rate (DDR) memory controller, but need not be. A DDR memory controller 100 is one which is capable of communicating with DDR synchronous dynamic random access memories (SDRAMs). See, e.g., JEDEC Standard No. 79 published June 2000, which is hereinafter referred to as the "JEDEC DDR SDRAM Specification".

FIG. 1 illustrates an exemplary computer system 124 in which the memory controller 100 may be used. The computer system 124 comprises a number of central processing units 102 (CPUs) which are connected to the memory controller 100 over a system bus 106. As shown in FIG. 1, the memory controller 100 preferably forms part of an integrated memory and input/output (I/O) controller (MIOC) 100. The MIOC 100 receives access requests over the system bus 106, and then addresses memory modules 104 and/or I/O devices 112–122 in order to process the memory access requests. Fetched data is then returned as necessary. Inbound memory access requests received from the I/O devices 112–122 may also be processed by the MIOC 100. As is known in the art, memory and I/O access requests typically comprise read requests and write requests. The MIOC 100 is coupled to a number of memory modules 104 over a memory bus 108, and is coupled to I/O devices 112–122 via local buses, interfaces, etc. 110 (e.g., a peripheral component interconnect (PCI) local bus, or an integrated device electronics (IDE) interface). The memory modules may comprise, for example, a number of DDR Dual In-Line Memory Modules (DIMMs). A DIMM is a fixed data width (usually 64 or 72 bits) collection of RAM devices (e.g., DDR SDRAMs). I/O devices may comprise one or more of the following, as well as other devices: drives 112 (e.g., hard drives, CD-ROM drives, floppy drives), ports 114 (e.g., USB, parallel, serial), a keyboard 116, a mouse 118 and/or other pointing devices, a display 120, and a printer 122.

It is important to note once again that FIG. 1 provides only one exemplary embodiment of a computer system 124 in which the memory controller 100 described below may be used, and thus the FIG. 1 computer system 124 is not meant to limit the invention and/or its applicable uses. It is also important to note that much of the following description refers only to a "memory controller" 100. However, one of ordinary skill in the art will readily comprehend that the features of a memory controller which are disclosed below may be readily adapted for use in a memory controller 100 forming part of the integrated "memory and I/O controller" 100 illustrated in FIGS. 1–3.

In FIG. 2, the MIOC 100 of FIG. 1 is shown to be coupled directly to a number of memory modules 104 via a 1x bus 200 (e.g., a 1x DDR bus). As defined herein, a 1x DDR bus 200 is a memory bus which operates in a conventional DDR mode, wherein data is transmitted in sync with both edges of a strobe signal.

A. Alternate or Simultaneous ×4, ×8, ×16 Attach

One feature of the memory controller 100 disclosed herein is that it can read and write data to non-homogeneous memory modules 104. To understand what is meant by "non-homogeneous memory modules", a little background is needed.

Memory modules 104 are available in a variety of configurations, the most popular of which is the Dual In-Line Memory Module (DIMM) configuration. Other configurations, of which there are many, include the Single In-Line Memory Module (SIMM) configuration, and the Small Outline DIMM (SO-DIMM) configuration.

Figure 9:
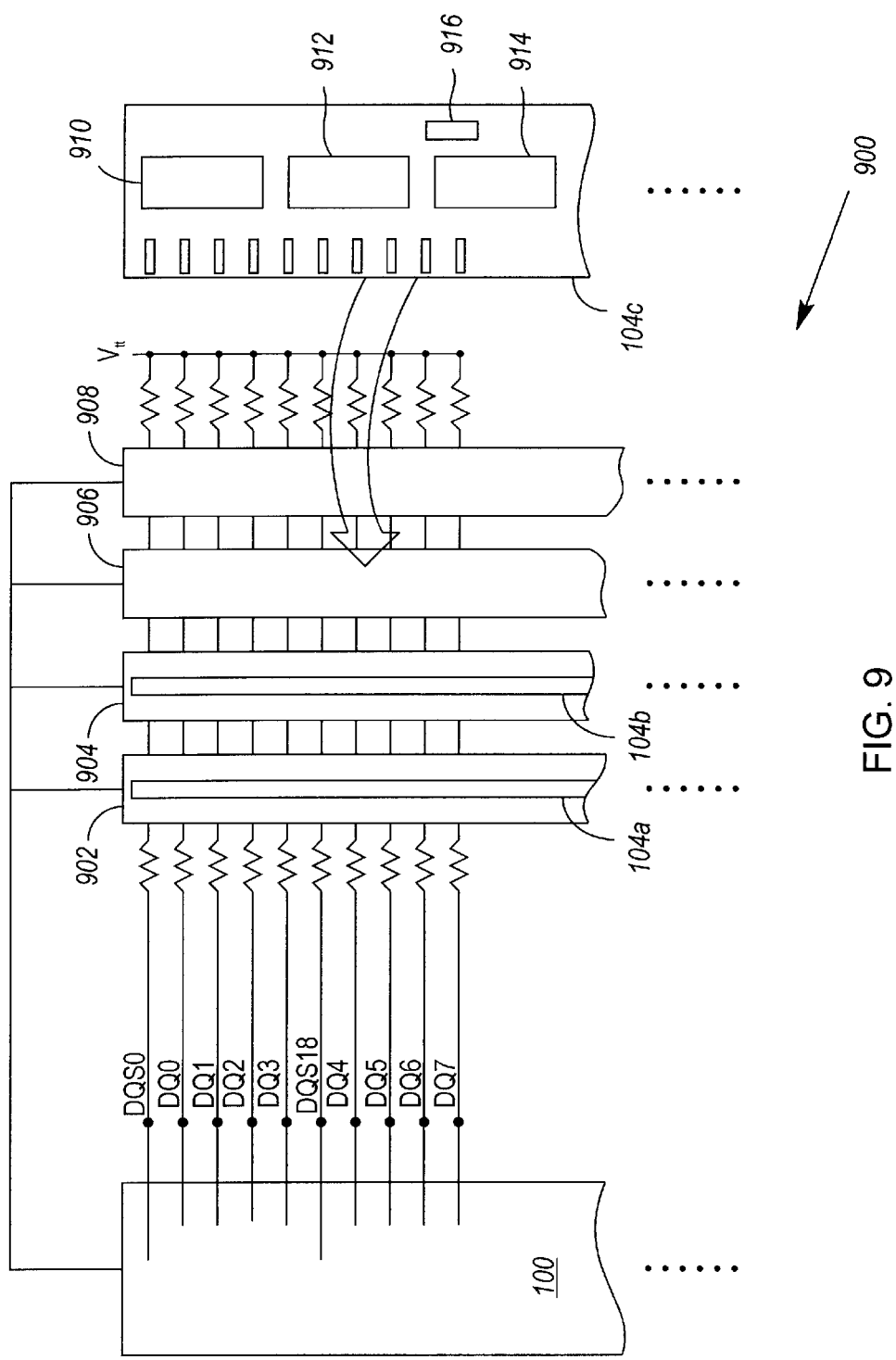
FIG. 9 illustrates a memory subsystem, including a third exemplary embodiment of FIG. 1's memory controller, wherein the memory controller comprises a plurality of corresponding strobe and data pads.

A common characteristic of the afore-mentioned memory module configurations is that each comprises a printed circuit board with a plurality of random access memory (RAM) devices mounted thereon. Similarly to the various configurations of memory modules, RAM devices may also assume a variety of configurations, the most popular of which is the SDRAM configuration. However, there is currently an industry push to transition to memory modules populated with DDR SDRAM devices. By way of example, FIG. 9 illustrates a plurality of DIMMs 104a, 104b, 104c which are populated with DDR SDRAM devices 910, 912, 914.

DDR SDRAM devices are currently available in three data widths, with devices of additional data widths being proposed. The currently available data widths are 4, 8 and 16 bits. As discussed in the JEDEC DDR SDRAM Specification, a 4-bit wide DDR SDRAM is known as a ×4 DDR SDRAM and is characterized by its generation/receipt of four data signals in response to a single strobe signal. Likewise, an 8-bit wide DDR SDRAM is known as a ×8 DDR SDRAM and is characterized by its generation/receipt of eight data signals in response to a single strobe signal; and a sixteen bit wide DDR SDRAM is known as a ×16 DDR SDRAM and is characterized by its generation/receipt of sixteen data signals in response to a pair of strobe signals. As is known by those skilled in the art, the interface of a ×16 DDR SDRAM is similar to that of a ×8 DDR SDRAM in that eight data signals are generated/received in response to each one of a ×16 DDR SDRAM's strobe signals.

In a typical computer system, a memory controller 100 is capable of accessing a number of like memory modules which are inserted into a plurality of sockets 902–908 on the computer system's motherboard. Often, a computer manufacture will pre-load a number of the sockets 902–908 with a number of like memory modules, and then instruct the computer system's end user that pre-loaded memory modules may be added to, removed or swapped so long as all of the computer's memory modules are of a specified, homogeneous module and RAM configuration (e.g., DIMMs comprised of SDRAMs). If a memory module is not of the specified module and RAM configuration, the computer system's memory controller will be unable to communicate with the memory module, and in some instances, the non-homogeneous memory module and/or the memory controller itself may be damaged. A computer user's memory upgrade options are therefore limited to one particular configuration of memory module. It would be desirable, however, if a computer user had more flexibility when upgrading his or her computer memory.

As a result, there is disclosed herein a memory controller 100 which is capable of reading and writing non-homogeneous memory modules 104. The memory modules 104 are non-homogeneous in that they comprise RAM devices of differing data widths. For example, two memory modules may comprise ×8 DDR SDRAMs, a third memory module may comprise ×4 DDR SDRAMs, and a fourth memory module may comprise ×16 DDR SDRAMs. The disclosed memory controller 100 communicates with the non-homogeneous memory modules 104 by storing and accessing a memory map 1100 (FIG. 11) of RAM device data widths, wherein a RAM device data width is stored for each of a computer system's memory modules 104. An access to the memory map 1100 is made "on the fly" prior to each read and write cycle. Thus, when a write to a ×4 DDR SDRAM located on a first memory module 104a is followed by a write to a ×8 DDR SDRAM located on a second memory module 104b, the memory controller 100 can perform the writes successively by 1) accessing the memory map 1100 prior to each write operation, and then 2) reconfiguring data and strobe driver circuitry as necessary.

To enable the memory controller's communication with a plurality of non-homogeneous memory modules 104, all that needs to be considered at the board level is that enough data and strobe routes are provided for the purpose of enabling an expansion socket's electrical connection to memory modules 104 comprised of varying data width RAM devices. Thus, when designing with the disclosed memory controller 100 in a DDR SDRAM environment, a computer manufacturer can 1) route fewer strobe signals to/from a memory controller 100 and provide a computer user with the ability to simultaneously use DIMMs comprised of ×8 and ×16 DDR SDRAMs in their computer system 124, or 2) route a few additional strobes to/from a memory controller 100 and provide a computer user with the ability to simultaneously use DIMMs comprised of ×4, ×8 and ×16 DDR SDRAMs 104 in their computer system 124. In either case, a computer user is provided with more flexibility to mix and match DIMMs than is currently provided.

A memory controller 100 that can read and write non-homogeneous memory modules 104 (i.e., memory modules comprised of non-homogeneous data width RAM devices) is advantageous in that it provides a computer user with a variety of memory upgrade options. For example, ×4 DDR SDRAMs are half as wide but twice as deep as ×8 and ×16 DDR SDRAMs. Thus, one can double their computer's memory capacity by using DIMMs populated with ×4 DDR SDRAMs in lieu of DIMMs populated with ×8 or ×16 DDR SDRAMs. However, given that DIMMs comprised of ×8 DDR SDRAMs are currently less expensive, one might wish to sacrifice some level of performance in favor of lower cost. Furthermore, a user might wish to add higher capacity DIMMs comprised of ×4 DDR SDRAMs to his or her computer system, but still keep and use the existing ×8 or ×16 DDR SDRAMs which came pre-loaded with his or her computer system.

Absent the memory controller 100 disclosed herein, the memory capacity of a computer system which only accepts DIMMs comprised of ×8 and/or ×16 DDR SDRAMs can only be increased through an increase in the number of loads per memory data bit (e.g., double or quadruple the number of loads). By so doing, the same memory capacity that can be achieved in a ×4 system can be achieved in a ×8/×16 system. A problem, however, is that with more loads per bit, the maximum operating frequency of each DIMM is decreased. Greater memory capacity is therefore achieved with a performance penalty. Memory operations initiated by the memory controller 100 disclosed herein are not subject to such performance penalties.

B. 1x or 2x Mode

Another feature of the memory controller 100 which is disclosed herein is that it can generate strobes and data (i.e., write) in either a 1x mode or Mx mode (where M≧2 and x is a baseline rate at which data is read and written). Likewise, it can receive data and strobes (i.e., read) in either a 1x mode or Mx mode.

In 1x mode, the memory controller 100 attaches directly to a plurality of memory modules 104 as illustrated in FIG. 2. In Mx mode, however, the memory controller 100 attaches to one or more intermediate chips 302 via a bus 300 which operates at an Mx speed. In Mx mode, reads and writes between the memory controller 100 and intermediate chips 302 occur at an Mx rate. However, reads and writes between the intermediate chips 302 and memory modules 104 continue to occur at a 1x rate. The advantage of using the intermediate chips 302 is that one can again double a system's memory capacity—this time by 1) using the intermediate chips 302 to receive 2x data and then distribute the 2x data in a 1x fashion to two banks of memory modules 104, or 2) using the intermediate chips 302 to receive 1x data from two banks of memory modules 104 and then multiplex the data to provide it to a memory controller 100 at a 2x rate.

Use of the intermediate chips 302 also allows one to double a memory system's bandwidth.

C. Read and Write Phase Delays

The memory controller 100 which is disclosed herein further provides an ability to delay read and write cycles by a single phase of the memory controller's internal clock. Thus, in addition to allowing read and write cycles to be tuned with full-cycle resolution, read and write cycles may be tuned with half-cycle resolution. Read and write cycles may therefore begin on either a rising or falling clock edge of the memory controller's internal clock. This feature provides a degree of tunability for the memory controller 100.

D. Tri-state Noise Immunity

Figure 21:
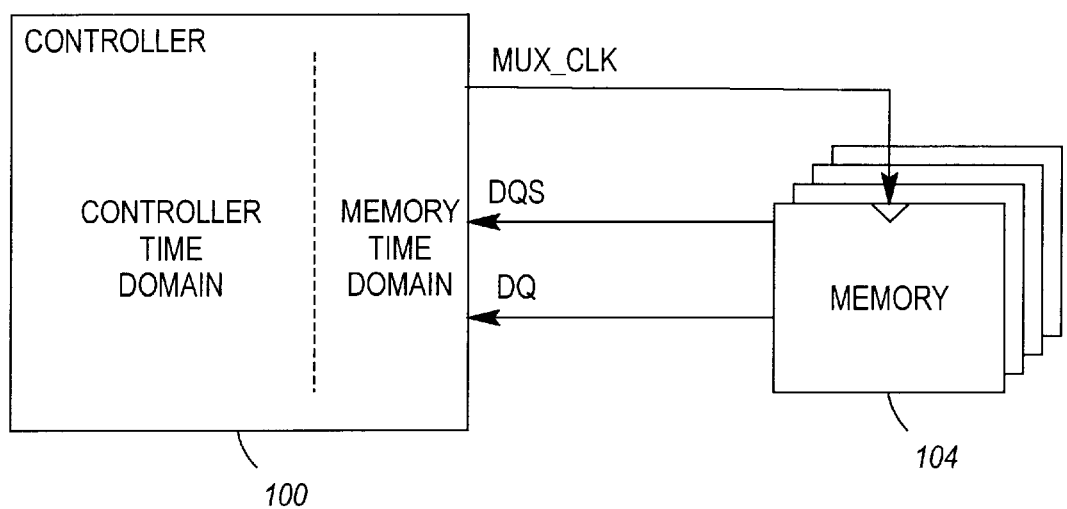
FIG. 21 illustrates a controller-memory-controller read path loop.

During a memory read cycle, there is a need to account for variation in controller-memory-controller loop delay (i.e., read loop delay). For example, in FIG. 21 a plurality of memory modules 104 is coupled to a memory controller 100 over common data (DQ) and strobe (DQS) buses. Not only is a plurality of memory modules 104 coupled to the data and strobe buses, but each of the memory modules 104 may exhibit timing variations within allowed ranges (e.g., within the ranges provided in the JEDEC DDR SDRAM Specification). Furthermore, copies of a clock signal which are distributed to each of the plurality of memory modules 104 may become skewed with respect to one another.

As a result of the above irregularities, read requests which are dispatched to different memory modules (with their varied timing characteristics and skewed clocks) can take varying amounts of time to return to the controller 100. As a result, there is a variation in read loop delay which needs to be accounted for when determining when to enable and disable the receipt of data and strobe signals at a memory controller 100. Such a delay can only be accounted for by ensuring that a memory controller 100 will appropriately receive data and strobes in response to a shortest possible loop delay (i.e., an early receipt case) and a longest possible loop delay (i.e., a late receipt case).

The data and strobe bus for memory modules 104 under the JEDEC DDR SDRAM Specification have a notable characteristic. The reference voltage for each bus line is the same as the bus line's termination voltage. What this means is that, as a result of noise, the strobe pads of a memory controller 100 are subject to erroneous "0" to "1" and "1" to "0" transitions when their corresponding bus lines are tri-stated. If not accounted for, these transitions can be erroneously interpreted as active strobe edges, thereby leading to potential data corruption.

The memory controller 100 disclosed herein solves the above problem by counting incoming strobe edges which are received at a strobe pad, and then using a count of the strobe edges to control a plurality of data latches which are coupled to a data pad. When a count representing an expected number of incoming strobe edges is reached, no further counting is undertaken, and noise which is produced as a result of a strobe bus tri-stating is prevented from latching additional data into the plurality of data latches.

2. Ability to Write in 1x or 2x Mode

Figure 4:
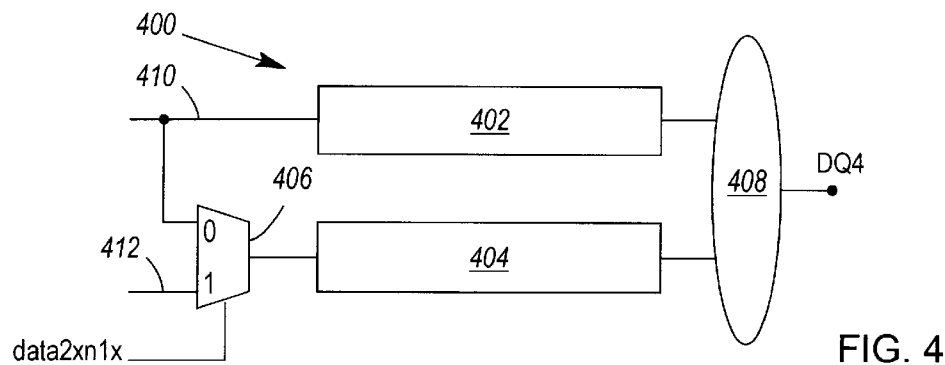
FIG. 4 illustrates memory controller driver circuitry which is capable of driving data in a 1x mode or 2x mode.

FIG. 4 illustrates a first preferred embodiment of driver circuitry 400 for a memory controller 100. The driver circuitry 400 comprises a data pad (DQ4), two data propagation circuits 402, 404, a multiplexing stage 406, and output merging circuitry 408. A first data stream 410 is provided to each of the data propagation circuits 402, 404, and a second data stream 412 is optionally provided to the second of the two data propagation circuits 404. The second data propagation circuit 404 receives either the first or second data stream 410, 412 via the multiplexing stage 406, which in FIG. 4 consists of a single multiplexer. The multiplexer 406 is controlled by a 2x mode signal (data2xn1x) which enables the first data stream 410 to be coupled to the multiplexer's output in a 1x mode of operation, and enables the second data stream 412 to be coupled to the multiplexer's output in a 2x mode of operation. In either mode, data propagates through each of the data propagation circuits 402, 404 to the output merging circuitry 408, at which point the two data propagation circuits 402, 404 are alternately coupled to the data pad to thereby generate either a 1x or 2x stream of data bits. Details of the output merging circuitry 408 will be discussed later in this description.

Functionally, the driver circuitry 400 depicted in FIG. 4 operates as follows. In 1x mode, the same data stream 410 is provided to each of the data propagation circuits 402, 404. As a result, a data bit which propagates through the first data propagation circuit 402 will appear at the data pad when the output merging circuitry 408 couples the first data propagation circuit 402 to the data pad. The same data bit will then appear at the data pad again when the output merging circuitry 408 later couples the second data propagation circuit 404 to the data pad. As a result, data bits will appear at the data pad at the same rate which they are provided to the driver circuitry 400 (i.e., in a 1x mode).

In the FIG. 4 driver circuitry's 2x mode of operation, a first data stream 410 is provided to the first data propagation circuit 402 and a second data stream 412 is provided to the second data propagation circuit 404. The first data stream 410 may comprise, for example, bits 0, 2, 4, . . . of a data stream, while the second data stream 412 may comprise, for example, bits 1, 3, 5, . . . of a data stream. As a result, different data bits propagate through each of the first and second data propagation circuits 402, 404, and the output merging circuitry 408 produces a 2x data stream of bits 0, 1, 2, . . . at the data pad. Note that the output data stream is considered a 2x data stream because it produces data bits at twice the rate of either of the driver circuitry's data input streams 410, 412.

Figure 5:
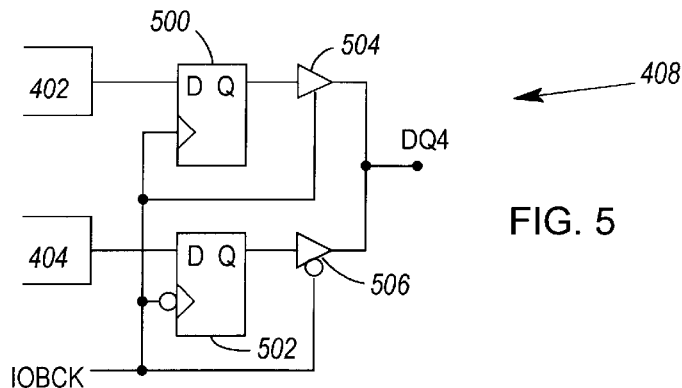
FIG. 5 illustrates a preferred embodiment of the output merging circuitry shown in FIG. 4.

An exemplary embodiment of the output merging circuitry 408 is disclosed in FIG. 5. The circuitry 408 comprises two D-type flip-flops 500, 502, each of which receives data from one of FIG. 4's two data propagation circuits 402, 404. The flip-flops 500, 502 are alternately clocked on the positive and negative edges of a clock IOBCK. The output of each flip-flop 500, 502 is respectively received by a tri-statable buffer 504, 506. Each buffer 504, 506 also receives the clock IOBCK, and is operated in sync with its corresponding flip-flop 500, 502. Thus, when data is clocked out of flip-flop 500, buffer 504 allows the data to pass through to data pad DQ4, and buffer 506 is tri-stated. Likewise, when data is clocked out of flip-flop 502, buffer 506 allows the data to pass through to data pad DQ4, and buffer 504 is tri-stated. The two flip-flops 500, 502 and buffers 504, 506 therefore alternately provide data to the data pad DQ4. Each corresponding flip-flop and buffer in FIG. 5 are an example of a tri-statable path, as referenced in the claims.

Note that the output merging circuitry 408 could also comprise a multiplexer in lieu of the flip-flops 500, 502 and buffers 504, 506. However, the arrangement set forth in FIG. 5 is preferred, because the C→Q time is minimized. In fact, it is preferable to minimize the C→Q time even further by integrating the functionality of the buffers 504, 506 into the flip-flops 500, 502.

Figure 6:
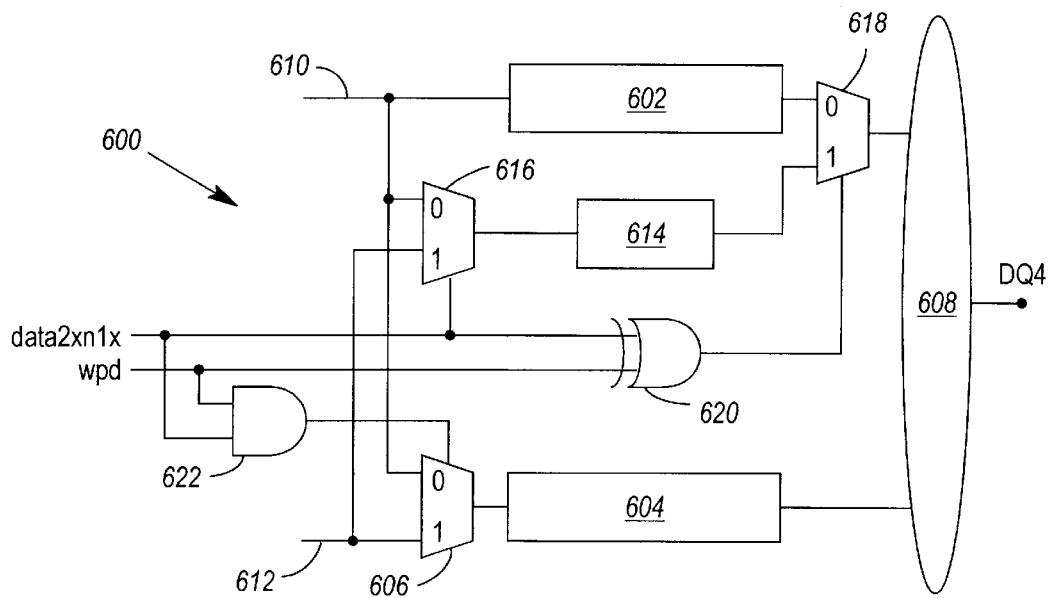
FIG. 6 illustrates a variation of the FIG. 4 memory controller driver circuitry, wherein circuitry is provided for initiating a write phase delay.

FIG. 6 illustrates a second preferred embodiment of driver circuitry 600 for a memory controller 100. Like the driver circuitry 400 illustrated in FIG. 4, the FIG. 6 driver circuitry 600 comprises a data pad (DQ4), two data propagation circuits 602, 604, a multiplexing stage 606, and output merging circuitry 608. However, the driver circuitry 600 additionally comprises a phase delay circuit 614 and first and second phase delay multiplexers 616, 618. The purpose of the additional phase delay circuitry 614–618 is to delay the appearance of data at the data pad and thereby incur a "write phase delay", as might be required to tune a system for maximum margin. The ability to delay a write using the phase delay circuitry 614–618 therefore provides the driver circuitry 600 with a tunability feature.

The first phase delay multiplexer 616 receives both first and second data streams 610, 612, and in response to the data2xn1x signal, selects either the first 610 or second 612 data stream for output to the phase delay circuit 614. The second phase delay multiplexer 618 receives data output from both the first data propagation circuit 602 and the phase delay circuit 614 and determines which data to output to the output merging circuitry 608 in response to the exclusive-OR 620 (XOR) of the data2xn1x signal with a write phase delay (wpd) signal. Note that the data2xn1x signal is asserted in 2x mode, and not asserted in 1x mode. However, the orientation of the wpd signal switches depending on the state of the data2xn1x signal. In 1x mode, the wpd signal is asserted for a write phase delay, and not asserted for no write phase delay. In 2x mode, the wpd signal is asserted for no write phase delay, and not asserted for the purpose of incurring a write phase delay.

Note that in FIG. 6, the multiplexing stage multiplexer 606 is no longer controlled by the data2xn1x signal, but is instead controlled by the AND 622 of the data2xn1x signal and the wpd signal.

Functionally, the FIG. 6 driver circuitry 600 operates as follows. In both 1x and 2x modes with no write phase delay (wpd=0 in 1x mode; wpd=1 in 2x mode), data propagates through the first and second data propagation circuits 602, 604, with data propagating through the first data propagation circuit 602 and output merging circuitry 608 first. In both 1x and 2x modes with a write phase delay (wpd=1 in 1x mode; wpd=0 in 2x mode), data propagates through the second data propagation circuit 604 and the phase delay circuit 614, with data propagating through the second data propagation circuit 604 and output merging circuitry 608 first. Note that with a write phase delay in either 1x or 2x mode, data may still propagate into the phase delay circuit 614. However, unless a write delay is indicated, the data which propagates into the phase delay circuit 614 will not propagate through the second phase delay multiplexer 618 and onto the data pad DQ4.

One of ordinary skill in the art will readily understand how each of the driver circuits 400, 600 disclosed in FIGS. 4 and 6 can be extrapolated to provide driver circuitry which is capable of operating in either a 1x or Nx mode. With respect to extrapolating the FIG. 6 circuitry for N>2, one will note that only a single phase delay circuit 614 is needed, regardless of the number of data propagation circuits 602, 604 which are added to the driver circuitry 600.

One of ordinary skill in the art will also understand how extrapolated driver circuitry (where N is an even number >2) can be used to supply an Mx data stream where 1<M ≦N.

Figure 7:
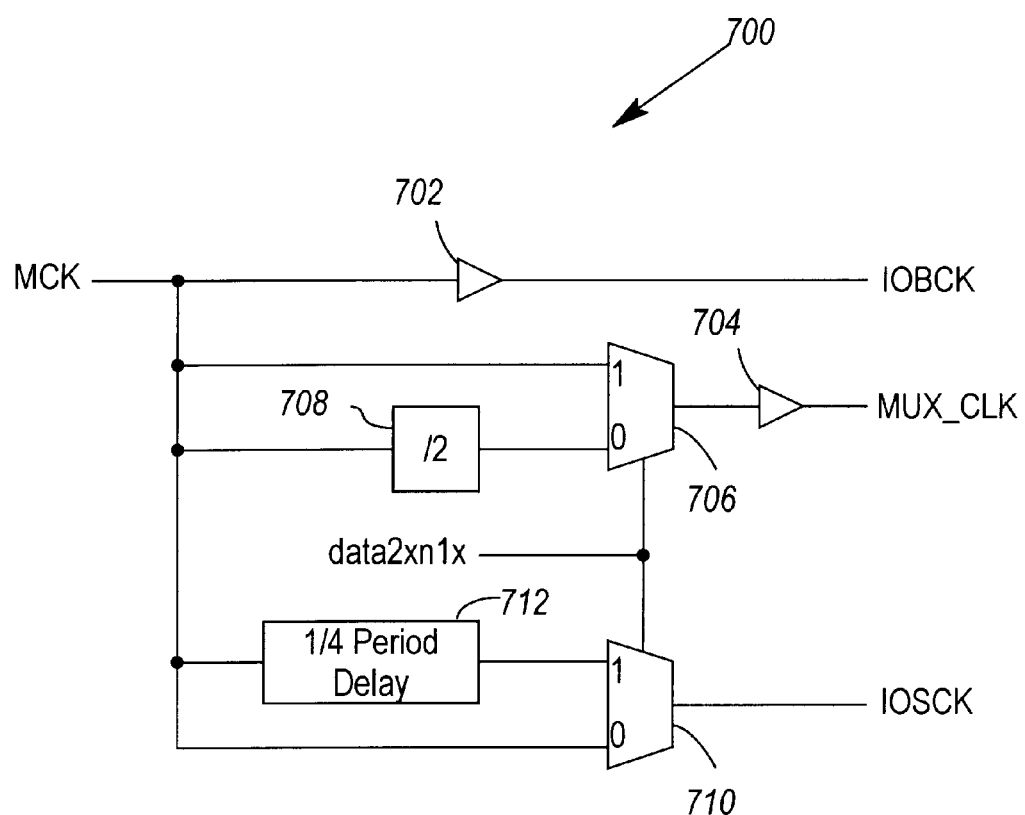
FIG. 7 illustrates a preferred embodiment of a clock circuit which produces many of the clock signals appearing in FIGS. 8, 12–19, and 21–26.
Figure 8:
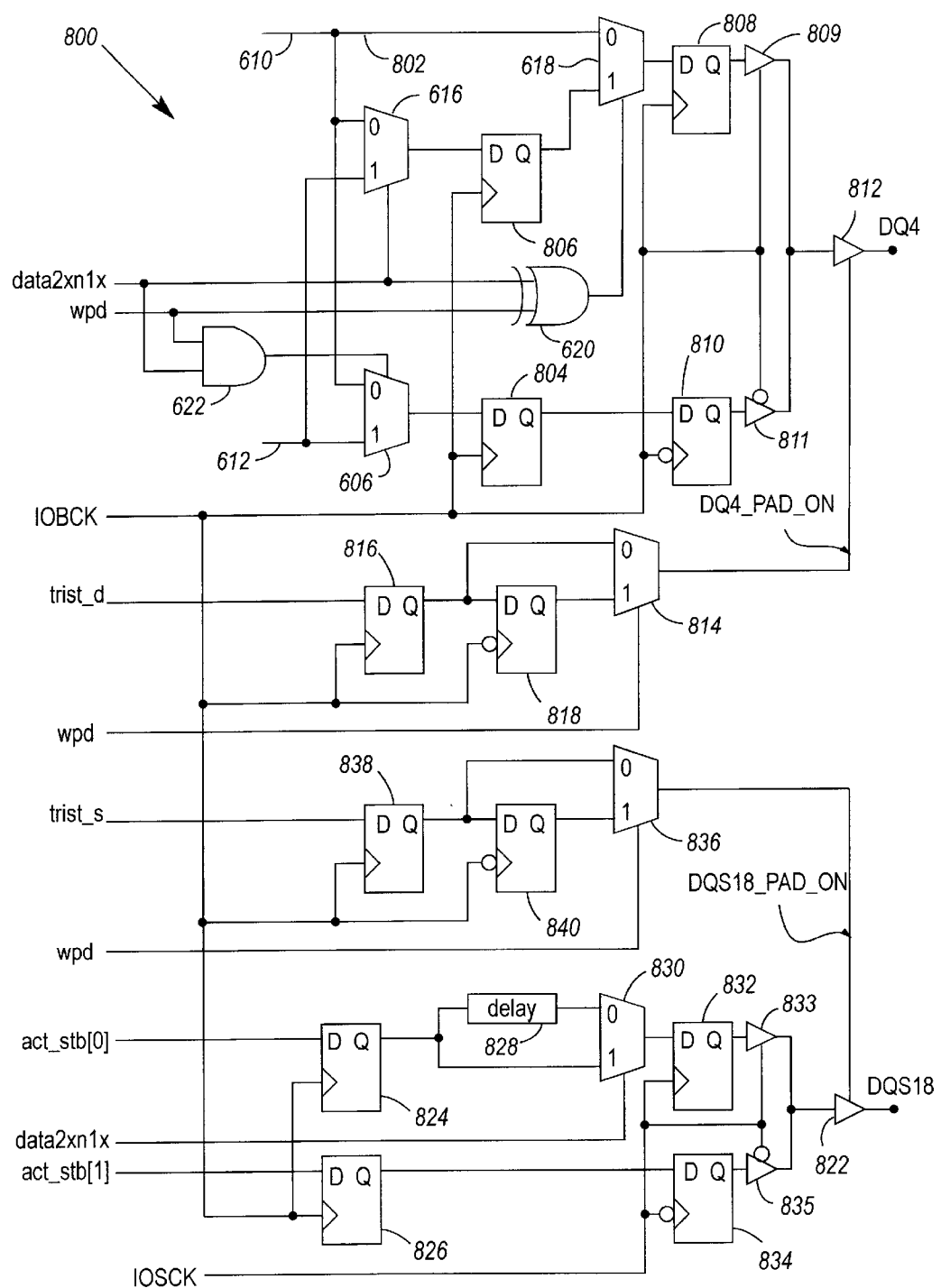
FIG. 8 illustrates a preferred embodiment of memory controller driver circuitry, including data driver circuitry and corresponding strobe driver circuitry.

FIGS. 7 and 8 illustrate an enhanced embodiment 800 of the FIG. 6 driver circuitry, wherein the data pad DQ4 may be tri-stated, and wherein a strobe which is produced at a strobe pad DQS18 is synchronized with the output of data at the data pad.

FIG. 7 illustrates a preferred embodiment of a clock circuit 700 which produces many of the clock signals appearing not only in FIG. 8, but also in FIGS. 12–20, and 22–27. The clock circuit 700 is driven by a core clock, MCK, of a memory controller. The clock circuit in turn outputs clocks IOBCK, MUX_CLK and IOSCK. Clock IOBCK is merely a buffered version of the MCK clock (buffered through a buffer 702). Clock MUX_CLK is buffered through a buffer 704, but is produced at either the rate of the MCK clock (i.e., when multiplexer 706 is configured for 1x mode operation) or at ½ the rate of the MCK clock (i.e., as a result of the divider 708 through which the MCK clock passes when multiplexer 706 is configured for 2x mode operation). Clock MUX_CLK may be provided to either a multiplexer chip 302 or a memory module 104 (see FIGS. 2 and 3). If multiplexer 710 is configured for 1x mode operation, clock IOSCK is equivalent to clock MCK. However, when multiplexer 710 is configured for 2x mode operation, clock IOSCK represents a version of MCK which is delayed by ¼ period (i.e., as a result of ¼ Period Delay circuitry 712). Clock IOSCK enables the FIG. 8 driver circuitry to provide appropriate 2x mode strobe signals to a preferred embodiment of an intermediary chip 302 (FIG. 3).

The driver circuitry 800 illustrated in FIG. 8 shares many similarities with the driver circuitry 600 illustrated in FIG. 6. The correspondence of components between FIGS. 6 and 8 is as follows. The first data propagation circuit 602 in FIG. 6 corresponds to a simple wire route 802 in FIG. 8; the second data propagation circuit 604 corresponds to a first D-type flip-flop 804; and the phase delay circuit 614 corresponds to a second D-type flip-flop 806. The correspondence of other FIG. 6 components is indicated in FIG. 8 by the use of like reference numbers.

The output merging circuitry illustrated in FIG. 8 is similar to that which is disclosed in FIG. 5 and comprises two D-type flip-flops 808, 810 and two tri-statable buffers 809, 811. If data may be alternately written and read through a data pad (e.g., data pad DQ4), then the ability to tri-state the pad's write path during reads may be desirable. Thus, FIG. 8 incorporates a tri-state buffer 812 between the output merging circuitry 808–811 and the data pad. The state of the buffer 812 is changed during the commencement and completion of writes using two signals: trist_d and wpd. The purpose of the wpd signal has already been discussed, supra. The trist_d signal is provided to a multiplexer 814 after incurring a delay through one or two D-type flip-flops 816, 818. These flip-flops 816, 818 are constructed and clocked similarly to flip-flops 804, 810 found in the output merging circuitry and second data propagation path. The state of the multiplexer 814 is controlled by the wpd signal such that the trist_d signal opens the tri-state buffer 812 in sync with the output merging circuitry's initial output of data from either the first data propagation path 802 or the second data propagation path 804 (i.e., when wpd is asserted (wpd=1 in 1x mode; wpd=0 in 2x mode), the output of data at pad DQ4 is delayed by ½ the period of clock IOBCK).

The JEDEC DDR SDRAM Specification dictates that data is to be transmitted synchronously with a strobe. As a result, the FIG. 8 driver circuitry is provided with a strobe pad (DQS18), and logic 824–835 for generating a strobe signal which is appropriately matched to the 1x or 2x data provided at the DQS18 data pad.

Circuitry 836, 838, 840 which is similar to that which enables the tri-state buffer 812 coupled to the data pad DQS may be used to operate the tri-state buffer 822 coupled to the strobe pad DQS18. However, for timing considerations which will be described later in this description, the circuitry is controlled by the wpd signal and a trist_S signal which functions separately, but similarly, to the trist_d signal.

A strobe is generated by providing a pair of signals, act_stb[0] and act_stb[1], to the two strobe propagation circuits 824/828, 826 of the strobe driver circuitry 824–835. In 2x mode with no write phase delay, act_stb[0] is forced low and act_stb[1] is forced high for the duration of a write cycle. The act_stb[0:1] signals are then respectively clocked through first and second pairs of D-type flip-flops 824/826, 832/834. The act_stb[0:1] signals are clocked through the first pair of flip-flops 824, 826 in parallel, but the act_stb[1] signal is clocked through the second pair of flip-flops 832, 834 first. Thus, by inverting the act_stb[0:1] signals during a 2x mode write with write phase delay, the first clocking of flip-flop 834 will hold the DQS18 output low for an additional ½ clock cycle (i.e., one phase) and delay the appearance of a strobe at the DQS18 output for ½ clock.

Note that as in the data driver circuitry, each flip-flop 832, 834 is followed by a tri-statable buffer 833, 835. These buffers 832, 834, in combination with flip-flops 832, 834, form strobe merging circuitry which functions similarly to the output merging circuitry 808–811 in the data path.

The states of act_stb[0] and act_stb[1] are therefore static during a 2x write. However, this is not the case in 1x mode. In 1x mode, each of the act_stb[0:1] signals toggle at a 1x rate, and a write phase delay is implemented by merely delaying the first rise of each of the act_stb[0:1] signals. Combinational logic circuits which may be used for both 1) generating the act_stb[0] and act_stb[1] signals, and 2) implementing additional strobe functionality which has yet to be described, will be discussed in the next section of this description.

3. Ability to Write DIMMs Comprised of ×4, ×8 and ×16 RAM Devices

The JEDEC DDR SDRAM Specification specifies that DDR SDRAMs may be constructed as ×4, ×8 or ×16 devices. Writes to ×4 DDR SDRAMs require one strobe signal for each set of four data signals (i.e., a 4:1 data/strobe ratio), while writes to ×8 and ×16 DDR SDRAMs require one strobe signal for each set of eight data signals (i.e., an 8:1 data/strobe ratio).

In the past, DDR memory controllers have been designed to communicate with one type of DDR memory module (i.e., a set of homogeneous memory modules comprised only of ×4, ×8 or ×16 DDR SDRAMs). However, a DDR memory controller would offer greater flexibility, particular when a computer user desires to upgrade his or her computer memory, if the memory controller were capable of communicating with memory modules comprised of non-homogeneous data width RAM devices. To fill this need, the memory controller illustrated in FIGS. 7–13 is capable of writing to memory modules comprised of non-homogeneous data width RAM devices (e.g., DIMMs comprised of ×4 DDR SDRAMs, DIMMs comprised of ×8 DDR SDRAMs, and DIMMs comprised of ×16 DDR SDRAMs).

FIG. 9 illustrates an exemplary environment in which the memory controller 100 may operate. Note that the memory controller 100 is coupled to a plurality of sockets 902–908 via common data and strobe lines. A first of the sockets 902 holds a DIMM 104a comprised of ×4 DDR SDRAMs; a second of the sockets 904 holds a DIMM 104b comprised of ×8 DDR SDRAMs; and a third of the sockets 906 holds a DIMM 104b comprised of ×16 DDR SDRAMS 910–914.

In FIG. 9, the memory controller 100 is illustrated to have a plurality of strobe pads, each of which is associated with a plurality of data pads. By way of example, and to offer seamless operation with existing DDR DIMMs, each strobe pad is shown to be associated with 4 data pads (e.g., strobe pad DQS0 corresponds to data pads DQ0–DQ3, and strobe pad DQS18 corresponds to data pads DQ4–DQ7). Although only two strobe and eight data pads are illustrated in FIG. 9, the memory controller 100 might comprise, for example, 36 strobe pads and 144 data pads.

Figures 10, 11:
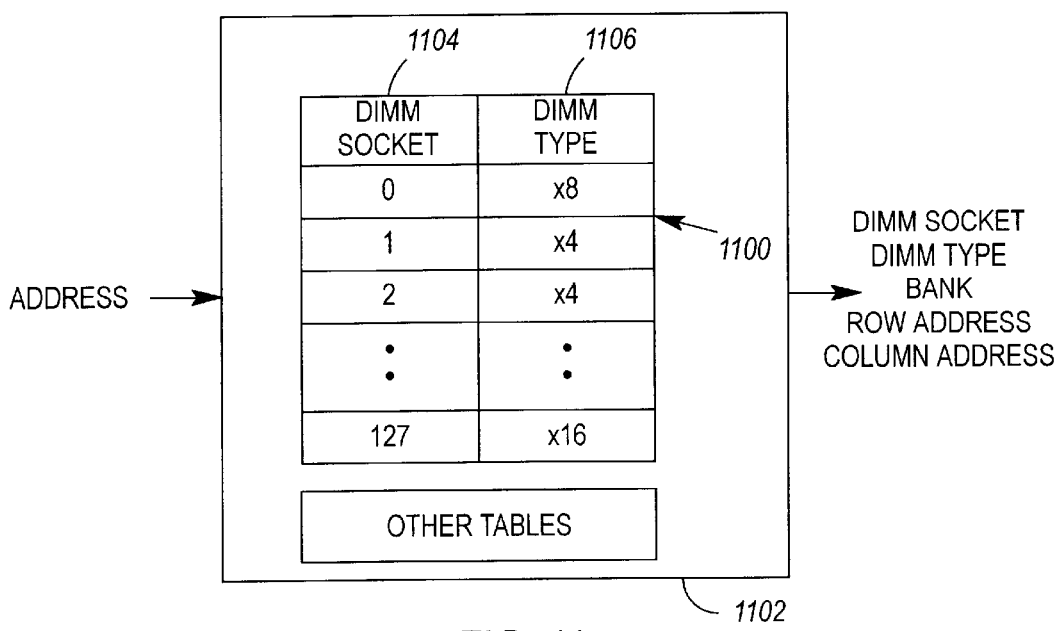
FIG. 10 illustrates an exemplary manner of matching strobe and data pads in order to support a memory controller's write to ×4, ×8 or ×16 DIMMs.
FIG. 11 illustrates a memory map for tracking whether ×4, ×8 or ×16 DIMMs are attached to the data and strobe pads of a memory controller.

As will be described in greater detail below, when communicating with DIMMs comprised of ×4 DDR SDRAMs, the memory controller 100 generates/receives signals at each of its data and strobe pads. As a result, there is a 4:1 correspondence between data and strobe signals when the memory controller 100 communicates with DIMMs comprised of ×4 DDR SDRAMs. However, when communicating with DIMMs comprised of ×8 or ×16 DDR SDRAMs, the memory controller 100 generates/receives data at each of its data pads, but only generates/receives strobes at its lower strobe pads (i.e., strobe pads DQS0–DQS17). As a result, there is an 8:1 correspondence between data and strobe signals when the memory controller communicates with DIMMs comprised of ×8 or ×16 DDR SDRAMs. FIG. 10 illustrates an exemplary mapping of strobe pads to data pads for the FIG. 9 memory controller, depending on whether the memory controller 100 is driving data to DIMMs comprised of ×4 or ×8/×16 DDR SDRAMs. Note that the memory controller's upper strobe pads are held low during writes to DIMMs comprised of ×8 or ×16 DDR SDRAMs.

A determination as to whether data is being written to a DIMM comprised of ×4 or ×8/×16 DDR SDRAMs may be made by maintaining a memory map 1100 (FIG. 11) within the FIG. 9 memory controller. Such a map 1100 may comprise a table of corresponding DIMM locations 1104 (e.g., sockets) and DIMM types, wherein the types specify, for example, 1) indications of RAM device data widths 1106 for a number of DIMMs, or 2) indications of data/strobe ratios for a number of DIMMs. The indications may comprise, for example, a value $A_x$ for each memory module x which is coupled to the memory controller 100.

The values $A_x$ stored in the memory map may be variously embodied. However, for the purpose of communicating with DIMMs 104 comprised of ×4, ×8 and ×16 DDR SDRAMs, each value $A_x$ may consist of a single binary bit, the two values of which represent the data/strobe ratios which are required to read and write ×4 and ×8/×16 DDR SDRAMs, respectively. For example, a logic "1" might represent a 4:1 data/strobe ratio, as required of DIMMs comprised of ×4 DDR SDRAMs, and a logic "0" might represent an 8:1 data/strobe ratio.

Alternatively, each value $A_x$ could be a binary equivalent of an actual data/strobe ratio. For example, a 4:1 data/strobe ratio could be stored in the memory map as the value "0100", while an 8:1 data/strobe ratio could be stored in the memory map 1100 as the value "1000". Given the data/strobe ratios assumed by ×4, ×8 and ×16 DDR SDRAMs, the storage of four bit values in a memory map 1100 is unnecessary. However, application of the above principles to non-DDR environments, and/or to future DDR environments, might make the storage of binary equivalents of data/strobe ratios more desirable.

Each value $A_x$ could also be (or represent) the data width of RAM devices 910–914 mounted on a DIMM 104c. However, if RAM devices of differing data widths have the same data/strobe ratios, as in the case of ×8 and ×16 DDR SDRAMs, the size of $A_x$ values may be reduced if each value $A_x$ merely represents the data/strobe ratio of RAM devices mounted on a DIMM.

The memory map 1100 may be maintained by initializing it upon boot or reconfiguration of a computer system 124. In a preferred embodiment, a RAM device data width is read from each memory module coupled to the memory controller 100, and each RAM device data width is then used to generate a value which is stored in the memory map 1100. Alternatively, although not preferred, the data widths retrieved from the memory modules 104 (or representations thereof) may be stored directly in the memory map 1100. If the memory modules 104 coupled to the memory controller 100 are DDR memory modules, then each memory module may maintain a DDR SDRAM data width in a serial presence detect ROM 916 located on the memory module. If the memory controller 100 executes a serial presence detect sequence within the memory modules 104, then a DDR SDRAM data width stored in a ROM of each memory module may be read, converted to an appropriate value $A_x$, and stored in the memory map 1100.

The memory map 1100 may also be maintained by providing it with a value $A_x$ for each memory module via a user interface (e.g., the bios SETUP utility of a computer system).

During a write cycle, the memory map 1100 is addressed by all or part of a memory address, and an addressed value $A_x$ is output from the memory map 1100. The output value is then used to determine, "on the fly", 1) how many strobes need to be generated by the memory controller 100, and 2) where the strobes need to be generated (i.e., at which strobe pads).

During write cycles of the memory controller 100, addressed values $A_x$ are received by strobe driver circuitry comprising two or more subsets of strobe driver circuits, wherein each strobe driver circuit may be configured as illustrated in FIG. 8. The subsets of strobe driver circuits are configured such that at least one of the subsets generates strobes in response to only a portion of said values $A_x$. For example, if each value $A_x$ consists of a single binary bit, one subset of strobe driver circuits might only generate strobes when $A_x=1$, while the other subset of strobe driver circuits might generate strobes for both values of $A_x$. Referring to FIG. 10, strobes are always generated at lower strobe pads, but strobes are only generated at upper strobes pads when the memory map outputs a logic "1" (i.e., when $A_x$ is a logic "1"). In this manner, strobes are generated at all strobe pads when an addressed value $A_x$ is indicative of a 4:1 strobe ratio, and strobes are generated at only half of the strobe pads (i.e., a subset of strobe pads consisting of the lower strobe pads) when $A_x$ is indicative of a 8:1 strobe ratio.

The memory map 1100 preferably forms part of a larger memory address router (MAR) 1102. The MAR 1102 may comprise other information regarding the type and organization of memory modules 104 coupled to the memory controller 100, in addition to supporting circuitry. When the MAR 1102 is provided with a memory address, the memory map 1100 and other tables are accessed to determine the DIMM socket and DIMM bank in which the address is located. A row and column address within the addressed DIMM is also determined. At the same time, a data/strobe ratio is accessed so that the strobe pads of the memory controller 100 illustrated in FIG. 9 may be appropriately configured for writing or receiving data from the DIMM type which is being addressed.

Figure 12:
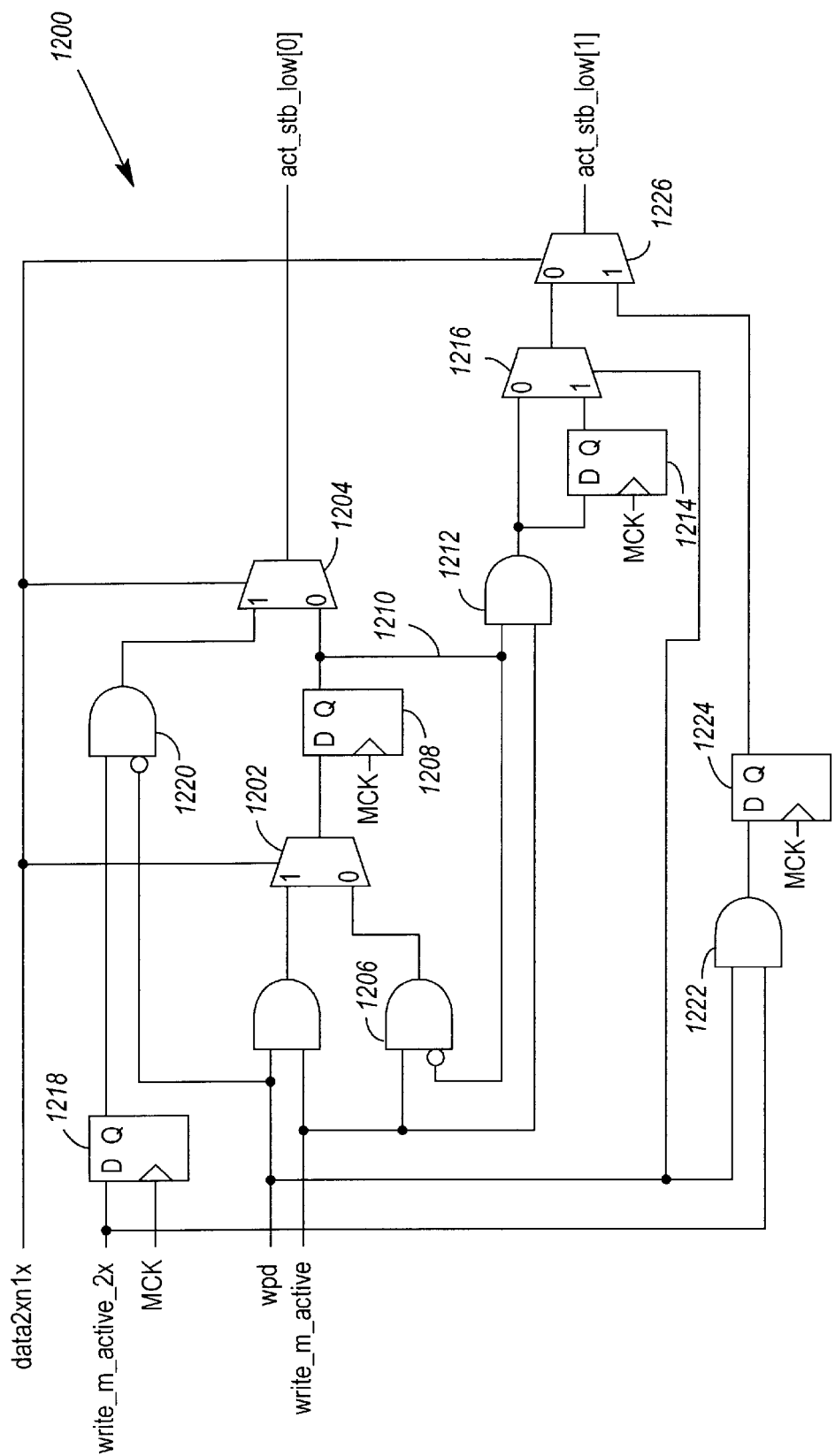
FIG. 12 illustrates a preferred embodiment of a circuit for providing the act_stb[0:1] signals (see FIG. 8) to lower strobe pads of the FIG. 9 memory controller.
Figure 13:
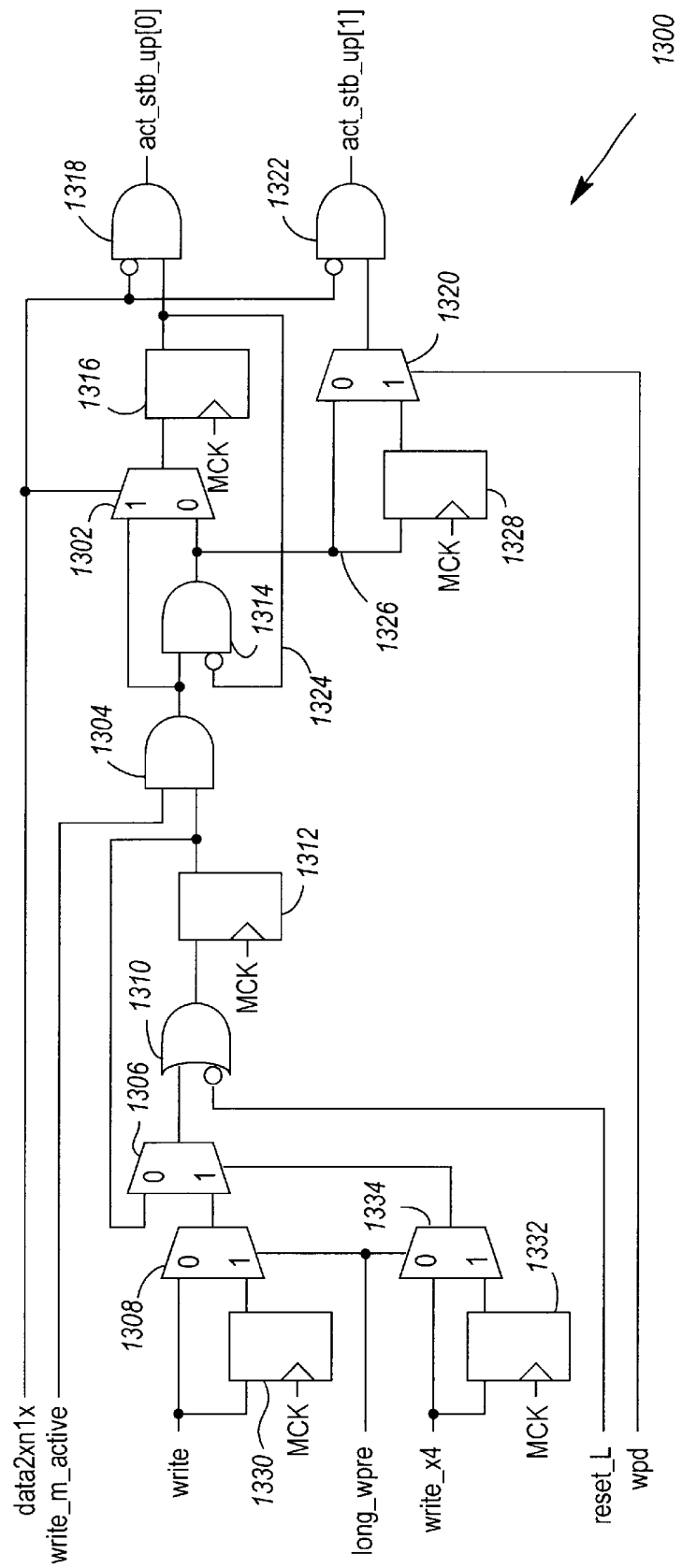
FIG. 13 illustrates a preferred embodiment of a circuit for providing the act_stb[0:1] signals (see FIG. 8) to upper strobe pads of the FIG. 9 memory controller.

The driver circuitry for the various data and strobe pads shown in FIG. 9 may be implemented as shown in FIG. 8. In such an implementation, it is the act_stb[0] and act_stb[1] signals which determine if, when and how a signal is generated at a strobe pad. Circuitry is therefore needed for generating two sets of the act_stb[0] and act_stb[1] signals. Circuitry 1200 for generating the set of act_stb[0] and act_stb[1] signals which are needed to configure the lower strobe pads (i.e., pads DQS0–DQS17) of the FIG. 9 memory controller is illustrated in FIG. 12, and circuitry 1300 for generating the act_stb[0] and act_stb[1] signals which are needed to configure the upper strobe pads (i.e., pads DQS18–DQS35) of the FIG. 9 memory controller is illustrated in FIG. 13. In FIG. 12, the act_stb[0] and act_stb[1] signals of FIG. 8 have been respectively renamed act_stb_low[0] and act_stb_low[1]. Likewise, in FIG. 13 the act_stb[0] and act_stb[1] si FIG. 8 have been respectively renamed act_stb_up[0] and act_stb_up[1].

Note that the circuitry 1200,1300 illustrated in FIGS. 12 and 13 is capable of operating in several modes, including 1x or 2x mode, and modes with or without a write phase delay. In addition, ×4 and ×8 write modes, either with or without a long write preamble, can be achieved. If a memory controller 100 with less functionality is desired, one of ordinary skill in the art will readily understand how to eliminate gates in the FIGS. 12 and 13 circuits to thereby eliminate functionality which is not needed for a given application.

Operation of the FIG. 12 circuitry in 1x mode will now be described. In 1x mode, the data2xn1x signal is driven low, and the assertion of the write_m_active signal begins the generation of act_stb_low[0:1] signals. When the data2xn1x signal is driven low, the multiplexers 1202,1204, 1226 which are controlled thereby output the data which is received at their "0" inputs. When the write_m_active signal is asserted, act_stb_low[0] begins to toggle at the frequency of clock MCK, yielding a signal of frequency MCK/2, due to the arrangement of gate 1206, multiplexer 1202, D-type flip-flop 1208, and feedback path 1210. Likewise, the assertion of the write_m_active signal causes act_stb_low[1] to toggle. For timing considerations, a gate 1212 is inserted in the act_stb_low[1] path. The gate 1212 receives the feedback signal 1210 and the write_m_active signal, and when the write_m_active signal is high, outputs the feedback signal 1210, and a version thereof which is delayed through a flip-flop 1214, to the inputs of an additional multiplexer 1216. The multiplexer 1216 is controlled by the wpd signal in order to propagate the feedback signal 1210 through to the act_stb_low[1] output with or without a delay. In the case of no write phase delay, act_stb_low[1] propagates through to the strobe pad DQS18 first (see FIG. 8). Otherwise, act_stb_low[0] propagates through to the strobe pad first. Thus, the assertion of the wpd signal causes a ½ cycle write phase delay to be incurred.

The FIG. 12 circuitry operates in 2x mode as follows. The data2xn1x signal is driven high, and the multiplexers 1202, 1204, 1226 which are controlled thereby output the data which is received at their "1" inputs. By means of flip-flop 1218 and gate 1220, act_stb_low[0] is asserted when write_m_active_2x is high and wpd is low (i.e., when there is a 2x write with a write phase delay). By means of gate 1222 and flip-flop 1224, act_stb_low[1] is asserted when write_m_active_2x and wpd are both high (i.e., when there is a 2x write with no write phase delay).

Note that the FIG. 12 circuitry is not able to achieve a long write preamble. However, a long write preamble may be achieved at a lower strobe pad, either in 1x or 2x mode, by asserting the trist_s signal one cycle early (see FIG. 8).

In summary, the FIG. 12 circuitry produces outputs which toggle in 1x mode, and produces outputs which are static opposites in 2x mode. The toggling outputs are used by the FIG. 8 circuitry to produce a 1x strobe, and the static outputs are used by the FIG. 8 circuitry to produce a 2x strobe.

The operation of FIG. 13 in 1x mode will now be described. In 1x mode, the data2xn1x signal is driven low, and the assertion of the write_m_active signal enables the generation of act_stb_up[0:1] signals. However, act_stb_up[0:1] signals are only generated when a write is being made to a DIMM comprised of ×4 DDR SDRAMs. When writing to DIMMs comprised of ×8 or ×16 DDR SDRAMs, the act_stb_up[0:1] signals are driven low so that no strobes are produced at the upper strobe pads of the FIG. 9 memory controller. Thus, FIG. 13 needs to be analyzed with respect to a ×4 write in 1x mode, and a ×8/×16 write in 1x mode.

During a ×4 write in 1x mode, the data2xn1x signal is driven low, and the multiplexer 1302 which is controlled thereby outputs the data which is received at its "0" input. When the write_m_active signal is asserted, the generation of act_stb_up[0:1] signals is enabled, but only if the second input to AND gate 1304 is asserted. During a 1x write of any kind, the reset_L signal is held high. Thus, the second input to AND gate 1304 will only be asserted when the output of mutiplexer 1306 is high. The output of multiplexer 1306 can only be asserted when the signal write_×4 is asserted (since the multiplexer 1306 is controlled by the output of multiplexer 1334). The write_×4 signal is therefore used to indicate whether a write is being made to a DIMM comprised of ×4 or ×8/×16 DDR SDRAMs, and thus the write_×4 signal is responsive to values $A_x$ output from the memory map 1100. If a write is being made to a DIMM comprised of ×4 DDR SDRAMs, the write_×4 signal is asserted, and it is possible for the FIG. 13 circuitry to produce act_stb_up[0:1] signals. On the other hand, when a write is being made to DIMMs comprised of ×8 or ×16 DDR SDRAMs, the write_×4 signal is deasserted, and outputs act_stb_up[0:1] are held low.

The operation of the FIG. 13 circuitry during a ×4 write in 1x mode proceeds as follows. With data2xn1x low, write_m_active high, and write_×4 high, the act_stb_up[0:1] signals remain low until the write signal is asserted. After assertion of the write signal, the write signal propagates through a path comprising multiplexers 1308 and 1306, OR gate 1310, D-type flip-flop 1312, AND gates 1304 and 1314, multiplexer 1302, D-type flip-flop 1316 and AND gate 1318 to thereby assert output act_stb_up[0]. The write signal also propagates through multiplexer 1320 and AND gate 1322 to thereby assert output act_stb_up[1]. Thereafter, and so long as the inputs to circuit 1300 do not change state (but for clock MCK), the act_stb_up[0:1] signals will toggle due to the presence of feedback path 1324.

A ×4 write in 1x mode may be delayed by ½ MCK cycle by asserting the wpd signal. Assertion of the wpd signal causes a ½ cycle strobe delay by causing input 1326 to multiplexer 1320 to be delayed through D-type flip-flop 1328.

A ×4 write in 1x mode may also be subject to a long write preamble. A write preamble is a period of time prior to the generation of a strobe signal during which a strobe pad is held in a low state. Such a preamble may be lengthened by asserting the long_wpre signal, thereby causing the write and write_×4 signals to be respectively delayed through a pair of D-type flip-flops 1330, 1332. Unlike assertion of the wpd signal, which only delays a first rising edge of the act_stb_up[1] output, assertion of the long_wpre signal delays the first rising edges of both of the act_stb_up[0:1] signals.

As mentioned earlier in this description, a ×8/×16 write in 1x mode results in the act_stb_up[0:1] signals being held low, since upper strobes are not necessary for a ×8/×16 write. The upper strobes are held low by holding the write_×4 signal low.

The FIG. 13 circuitry operates in 2x mode as follows. The data2xn1x signal is driven high, and gates 1318 and 1322 are disabled. As a result, act_stb_up[0] and act_stb_up[1] are always held low in 2x mode. The reason that the act_stb_up[0:1] signals are not generated in 2x mode is that a choice was made to make intermediary chips 302 (FIG. 3) simpler by always writing to them as if they are ×8 DIMMs. Thus fewer signals are routed to the intermediary chips 302, and when necessary, the intermediary chips 302 generate the additional strobes which they need to write to ×4 DIMMs.

4. Write Timings

FIGS. 14–17 illustrate write timings of the memory controller driver circuitry illustrated in FIGS. 7, 8, 12 and 13.

Figure 14:
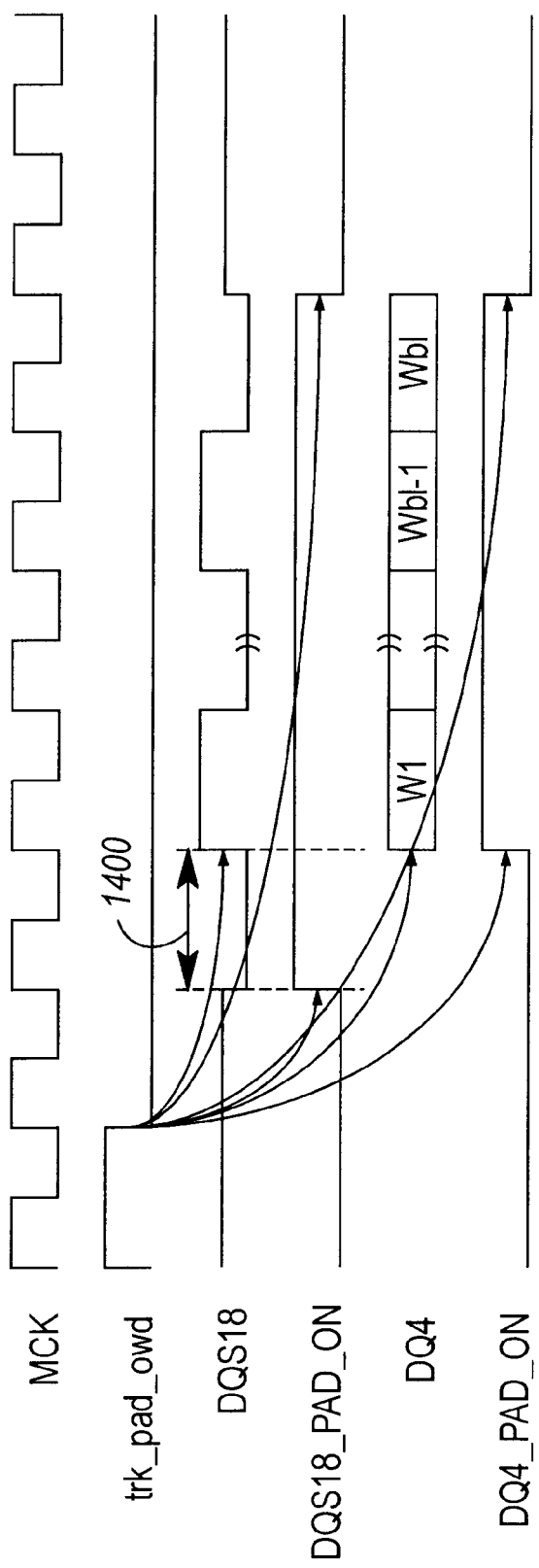
FIG. 14 illustrates write timings of the FIG. 8 driver circuitry when configured in 1x mode with aligned write strobes, wpd=0, and long_wpre=0.
Figure 29:
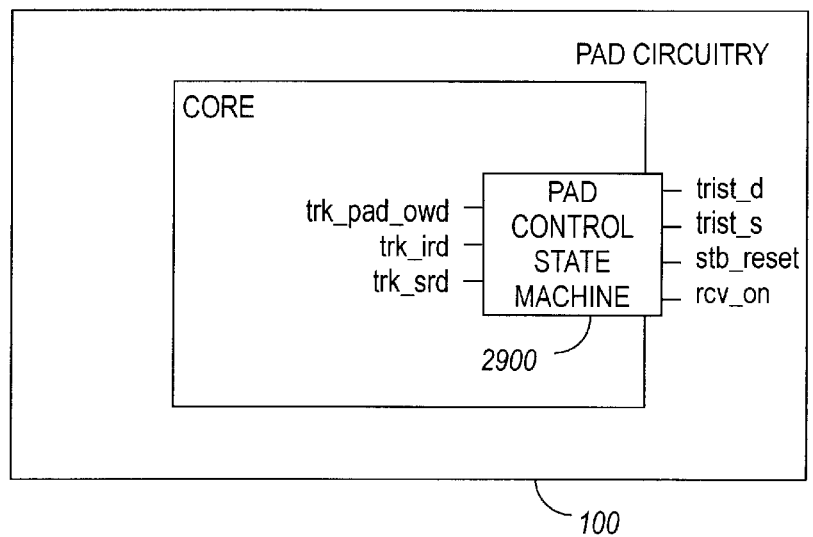
FIG. 29 illustrates a relation between the core and pad circuitry of the FIG. 1 memory controller.

In FIG. 14, DQ4_PAD_ON asserts on the same cycle that DQ4 is driven. As shown in FIG. 8, DQ4_PAD_ON is the signal which enables the tri-state buffer coupled to the DQ4 pad. Likewise, DQS18_PAD_ON is the signal which enables the tri-state buffer coupled to the DQS18 pad. W1, Wb1-1 and Wb1 represent consecutive bits of a data word appearing at the DQ4 pad. FIG. 14 illustrates the case where long_wpre=0, and hence specifies a write preamble 1400 of one MCK clock cycle. FIG. 14 also assumes that wpd=0. If wpd were asserted, then the DQS18, DQS18_PAD_ON, DQ4, and DQ4_PAD_ON signals would all shift to the right ½ MCK cycle (i.e., one phase). The signals connected to trk_pad_owd by arrows are all controlled by the assertion of trk_pad_owd, and therefore have a fixed timing with respect to each other. The trk_pad_owd signal is a signal which causes a memory controller pad to "output write data". The signal is generated in the core of memory controller 100 and is provided to a pad control state machine 2900 (FIG. 29) for the purpose of generating signals trist_d and trist_s (FIG. 8). FIG. 14 applies to the write timings of a lower strobe pad (i.e., a strobe pad that is configured to write to DIMMs comprised of ×4 and ×8/×16 DDR SDRAMS). An upper strobe pad (i.e., a strobe pad that is only configured to write to DIMMs comprised of ×4 DDR SDRAMs) would hold the DQS18 line low when writes occur to DIMMs comprised of ×8/×16 DDR SDRAMs.

Figure 15:
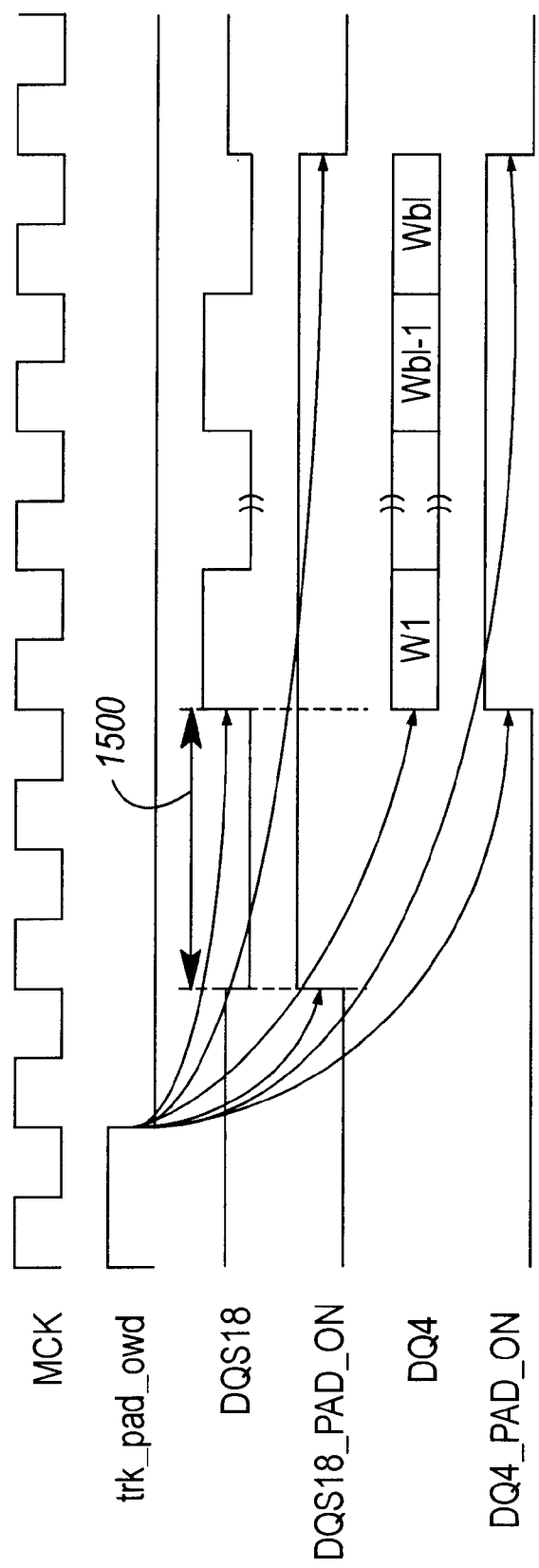
FIG. 15 illustrates write timings of the FIG. 8 driver circuitry when configured in 1x mode with aligned write strobes, wpd=0, and long_wpre=1.

FIG. 15 is similar to FIG. 14, but with a long write preamble (i.e., long_wpre=1). Hence, a write preamble 1500 of two MCK clock cycles is indicated.

Figure 16:
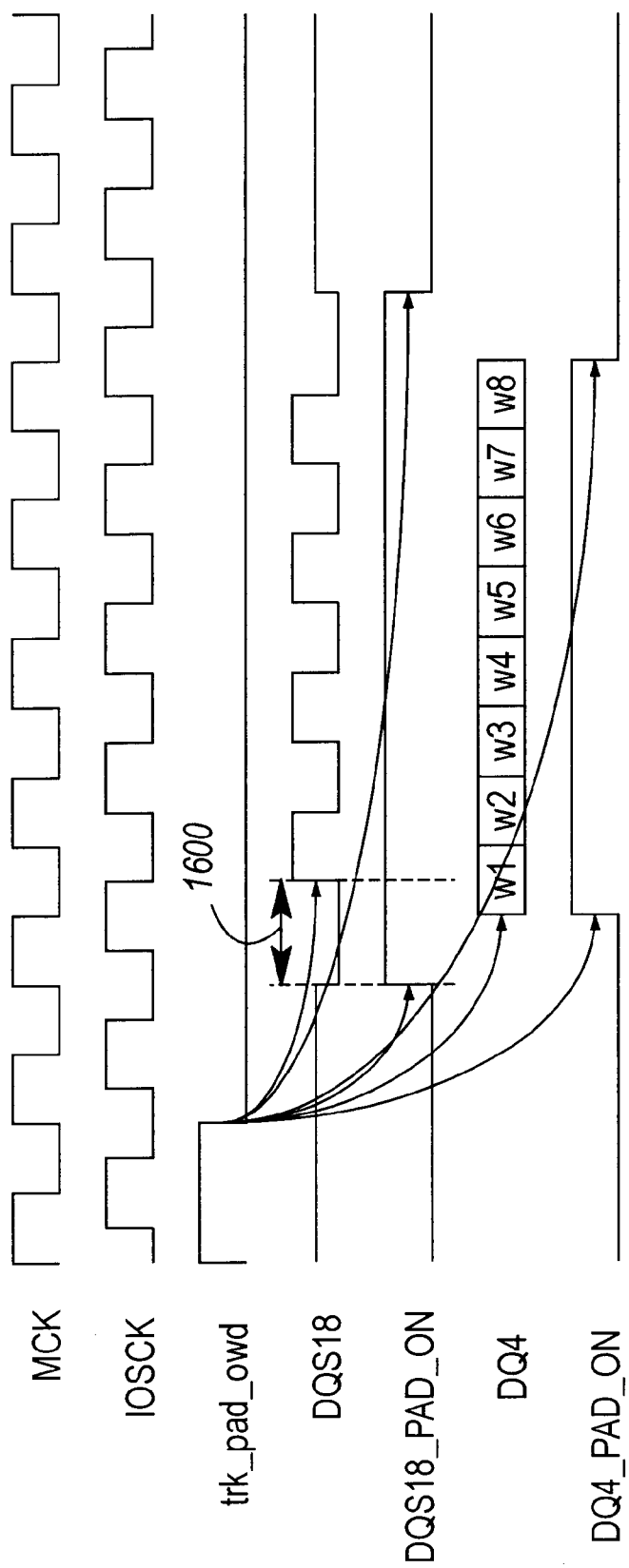
FIG. 16 illustrates write timings of the FIG. 8 driver circuitry when configured in 2x mode with delayed write strobes, wpd=0, and long_wpre=0.

In FIG. 16, DQ4_PAD_ON asserts on the same cycle that DQ4 is driven. w1, w2, . . . w8 represent consecutive bits of a data word appearing ath DQ4 pad. FIG. 16 illustrates the case where long_wpre=0, and hence specifies a write preamble 1600 of 0.75 MCK clock cycles. A 0.75 mck cycle postamble is also provided. FIG. 16 also assumes that wpd=0. If wpd were asserted, then the DQS18, DQS18_PAD_ON, DQ4, and DQ4_PAD_ON signals would all shift to the right ½ MCK cycle (i.e., one phase). The signals connected to trk_pad_owd by arrows are all controlled by the assertion of trk_pad_owd, and therefore have a fixed timing with respect to each other. FIG. 16 applies to write timings of a lower strobe pad. An upper strobe pad would hold the DQS18 line low when writes occur to DIMMs comprised of ×8 or ×16 DDR SDRAMs.

Figure 17:
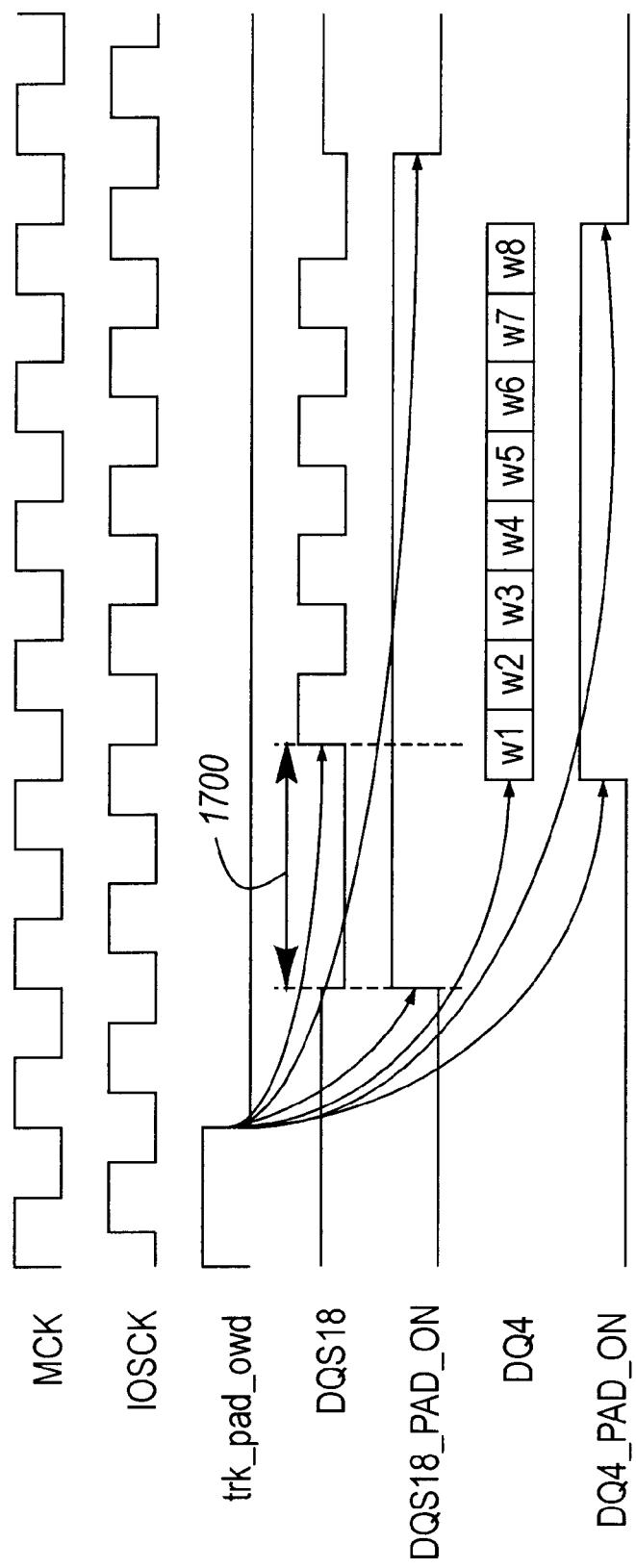
FIG. 17 illustrates write timings of the FIG. 8 driver circuitry when configured in 2x mode with delayed write strobes, wpd=0, and long_wpre=1.

FIG. 17 is similar to FIG. 16, but with a long write preamble (i.e., long_wpre=1). Hence, a write preamble 1700 of 1.75 MCK clock cycles is indicated.

5. Ability to Read in 1x or 2x Mode

Figure 18:
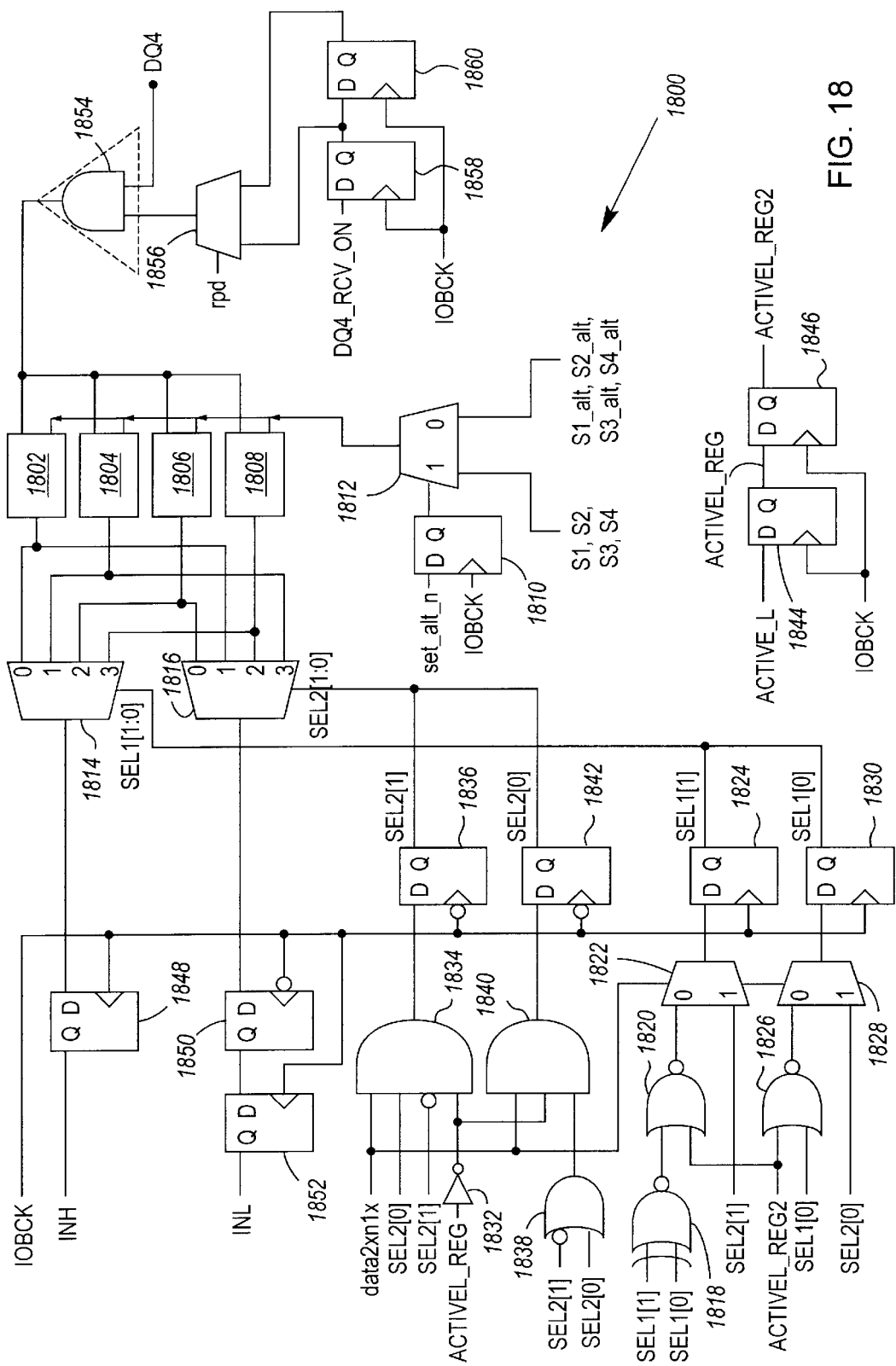
FIG. 18 illustrates a preferred embodiment of a memory controller's data receiver circuitry.

FIG. 18 illustrates a preferred embodiment of receiver circuitry 1800 for a double data rate memory controller 100 (FIG. 9). The receiver circuitry 1800 comprises a data pad (DQ4), four transparent data input latches 1802, 1804, 1806, 1808, strobe distribution circuitry 1810, 1812 (for distributing strobes to the data input latches 1802–1808 by means of a count of strobe edges, thereby providing a means for reading data from a DIMM comprised of ×4, ×8 or ×16 DDR SDRAMS), a pair of 4:1 deskew multiplexers 1814, 1816 (i.e., a deskew multiplexing stage), and multiplexer select logic 1818–1846 for providing the deskew multiplexers 1814,1816 with an appropriate set of control signals (depending on whether the receiver circuitry 1800 is configured for a read in 1x mode or Mx (e.g., 2x) mode). Note that the data pad disclosed in FIG. 18 is preferably synonymous with the data pad disclosed in FIG. 8, and is thus a bidirectional data pad.

The four data input latches 1802–1808 each receive the entire stream of data appearing at the data pad DQ4. However, the data input latches 1802–1808 are made transparent one at a time, sequentially, and in response to a strobe signal received at a strobe pad DQS18 (FIG. 19) so that 1) a first data bit is latched into latch 1802 in response to a first incoming strobe edge received at the DQS18 strobe pad, 2) a second data bit is latched into latch 1804 in response to a second incoming strobe edge received at the DQS18 pad, 3) a third data bit is latched into latch 1806 in response to a third incoming strobe edge received at the DQS18 pad, 4) a fourth data bit is latched into latch 1808 in response to a fourth incoming strobe edge received at the DQS18 pad, and then 5) new data bits are sequentially latched into latches 1802–1808 again, beginning with latch 1802, if additional data bits need to be received at the DQ4 pad.

The generation of signals S1–S4 (or as can be seen in FIG. 18, signals S1_alt–S4_alt) will be described in a later section of this description. For purposes of this section of the description, one need only understand that a set of control pulses such as signals S1–S4 are provided for latching data into the respective data input latches 1802–1808. Regardless of whether the receiver circuitry 1800 is configured to operate in 1x or 2x mode, and regardless of whether data is received from a DIMM comprised of ×4 DDR SDRAMs, ×8/×16 DDR SDRAMs, or an intermediary chip 302, control signals S1–S4 are sequentially asserted in response to incoming strobe edges received at a strobe pad. The S1–S4 clock pulses are therefore produced at a 1x or 2x DDR clock rate, depending on the rate at which strobe edges are received at a corresponding strobe pad.

As illustrated in FIG. 18, each of the transparent data input latches 1802–1808 is coupled to inputs of first and second 4:1 deskew multiplexers 1814, 1816. In 1x mode, however, the output of the second deskew multiplexer 1816 is meaningless and is ignored. As can be seen in the figure, the deassertion of the data2xn1x signal holds the control inputs of the second deskew multiplexer 1816 constant during a 1x mode read.

In a 1x mode burst of four read, four data bits are respectively clocked into data input latches 1802–1808. Due to multiplexer select logic comprising four D-type flip-flops 1824, 1830, 1844, 1846, three gates 1818, 1820, 1826, and two multiplexers 1822, 1828, the data inputs of the first deskew multiplexer 1814 are sequentially coupled to the multiplexer's output in the order 0, 2, 1, 3. The first deskew multiplexer 1814 therefore outputs data bits sequentially, in the order they are received at the DQ4 data pad. Each output of the first deskew multiplexer 1814 is clocked into the core clock domain of the FIG. 9 memory controller on a rising edge of the controller's IOBCK clock (i.e., clocked through D-type flip-flop 1848 at a 1x DDR rate).

The control signals generated by the multiplexer select logic 1824, 1830, 1844, 1846, 1818, 1820, 1826, 1822, 1828 in 1x mode are sometimes referred to in the claims as a first set of control signals.

Note that the data input latches 1802–1808 operate in the time domain of a strobe signal which is received at a strobe pad corresponding to the data pad DQ4 (e.g., the strobe pad DQS18). However, the deskew multiplexers 1814, 1816 operate in the clock domain of the memory controller 100. Due to the latching of data in four data input latches 1802–1808, the memory controller 100 (and especially the multiplexer select logic 1818–1846 for controlling the deskew multiplexers 1814, 1816) is provided with a window equal to 1.5 periods of an incoming strobe signal to clock data out of a data input latch and into the core of the memory controller 100. One of ordinary skill in the art will readily comprehend that the number of data input latches 1802–1808 provided in the FIG. 18 receiver circuitry may be extrapolated to P latches, with P>2, to thereby provide a shorter or longer period for transferring data from the strobe domain of an incoming strobe signal to the clock domain of the memory controller 100. One will also understand that other kinds of storage elements may be used in lieu of transparent data input latches 1802–1808 (e.g., D-type flip-flops).

A 1x mode burst of eight read operates similarly to a 1x mode burst of four read, with two sets of four data bits being latched into data input latches 1802–1808. The data inputs of the first deskew multiplexer 1814 are therefore coupled to its output in the order 0, 2, 1, 3, 0, 2, 1, 3.

In 2x mode, all reads are preferably executed as bursts of eight. The data input latches 1802–1808 are therefore made transparent similarly to a 1x mode burst of eight read, but at twice the rate. In 2x mode, however, both deskew multiplexers 1814, 1816 are active, with their inputs being active in the following order:

input 0, multiplexer 1814 input 0, multiplexer 1816 input 1, multiplexer 1814 input 2, multiplexer 1816

Note that the control signals for both multiplexers 1814, 1816 change state in sync with memory controller clock IOBCK, but that the control signals of multiplexer 1816 change state ½ IOBCK clock cycle out of phase with the control signals for multiplexer 1814.

In 2x mode, the multiplexer select logic which controls the two deskew multiplexers 1814, 1816 comprises five D-type flip-flops 1824, 1830, 1836, 1842, 1844, four gates 1832, 1834, 1838, 1840, and two multiplexers 1822, 1828. The control signals generated by the multiplexer select logic 1824, 1830, 1836, 1842, 1844, 1832, 1834, 1838, 1840, 1822, 1828 in 2x mode are sometimes referred to in the claims as a second set of control signals. Note that regardless of whether data bits are received by the FIG. 18 circuitry 1800 in 1x or 2x mode, each of the control signals which are generated by the multiplexer select logic 1818–1846 may be generated at a 1x rate, even though together, the deskew multiplexers 1814, 1816 effectively produce data at a 2x rate.

Due to the two alternately clocked D-type flip-flops 1850, 1852 which are coupled to the output of the second deskew multiplexer 1816, even and odd 2x data bits are output to the core of the memory controller 100 in parallel. This fact is merely a design choice, and is only provided for completeness of the preferred embodiment's description.

The FIG. 18 receiver circuitry may be enabled and disabled via AND gate 1854. The AND gate 1854 is enabled and disabled via the output of a multiplexer 1856, which outputs the signal DQ4_RCV_ON after ½ or 1 cycle of clock IOBCK (as determined by a pair of cascaded D-type flip-flops 1858, 1860 and the state of the read phase delay (rpd) signal). The purpose of the AND gate 1854 and its associated logic 1856–1860 is to shield downstream receiver circuitry 1802–1808, 1814, 1816, 1848–1852 from noise that could be present when the bus coupled to data pad DQ4 is idle and tri-stated.

6. Tri-state Noise Immunity on Reads

During a memory read cycle, there is a need to account for variation in controller-memory-controller loop delay (i.e., read loop delay). For example, in FIG. 21 a plurality of memory modules 104 is coupled to a memory controller 100 over common data (DQ) and strobe (DQS) buses. Not only is a plurality of memory modules 104 coupled to the data and strobe buses, but each of the memory modules 104 may exhibit timing variations within allowed ranges (e.g., within the ranges provided in the JEDEC DDR SDRAM Specification). Furthermore, copies of a clock signal which are distributed to each of the plurality of memory modules 104 may become skewed with respect to one another.

As a result of the above irregularities, read requests which are dispatched to different memory modules (with their varied timing characteristics and skewed clocks) can take varying amounts of time to return to the controller, and there is a variation in read loop delay which needs to be accounted for when determining when to enable and disable the receipt of data and strobe signals at a memory controller 100. Such a delay can only be accounted for by ensuring that a memory controller 100 will appropriately receive data and strobes in response to a shortest possible loop delay (i.e., an early receipt case) and a longest possible loop delay (i.e., a late receipt case).

The data and strobe buses for memory modules 104 under the JEDEC DDR SDRAM Specification have a notable characteristic. The reference voltage for each bus line is the same as the bus line's termination voltage. What this means is that, as a result of noise, the strobe pads of a memory controller 100 are subject to erroneous "0" to "1" and "1" to "0" transitions when their corresponding bus lines are tri-stated. If not accounted for, these transitions can be erroneously interpreted as active strobe edges, thereby leading to potential data corruption.

The JEDEC DDR SDRAM specification attempts to overcome this problem by providing a "read preamble" and "read postamble". The read preamble provides a period of time before the first incoming strobe edge during which a strobe pad is held low. Likewise, the read postamble provides a period of time after the last incoming strobe edge during which a strobe pad is held low. As a result, strobe edges can arrive at a strobe pad somewhat early or somewhat late and still fall within the period which a memory controller 100 allots for the return of a read cycle. However, problems can still arise when the variation between early and late arriving strobe edges is great.

Figure 19:
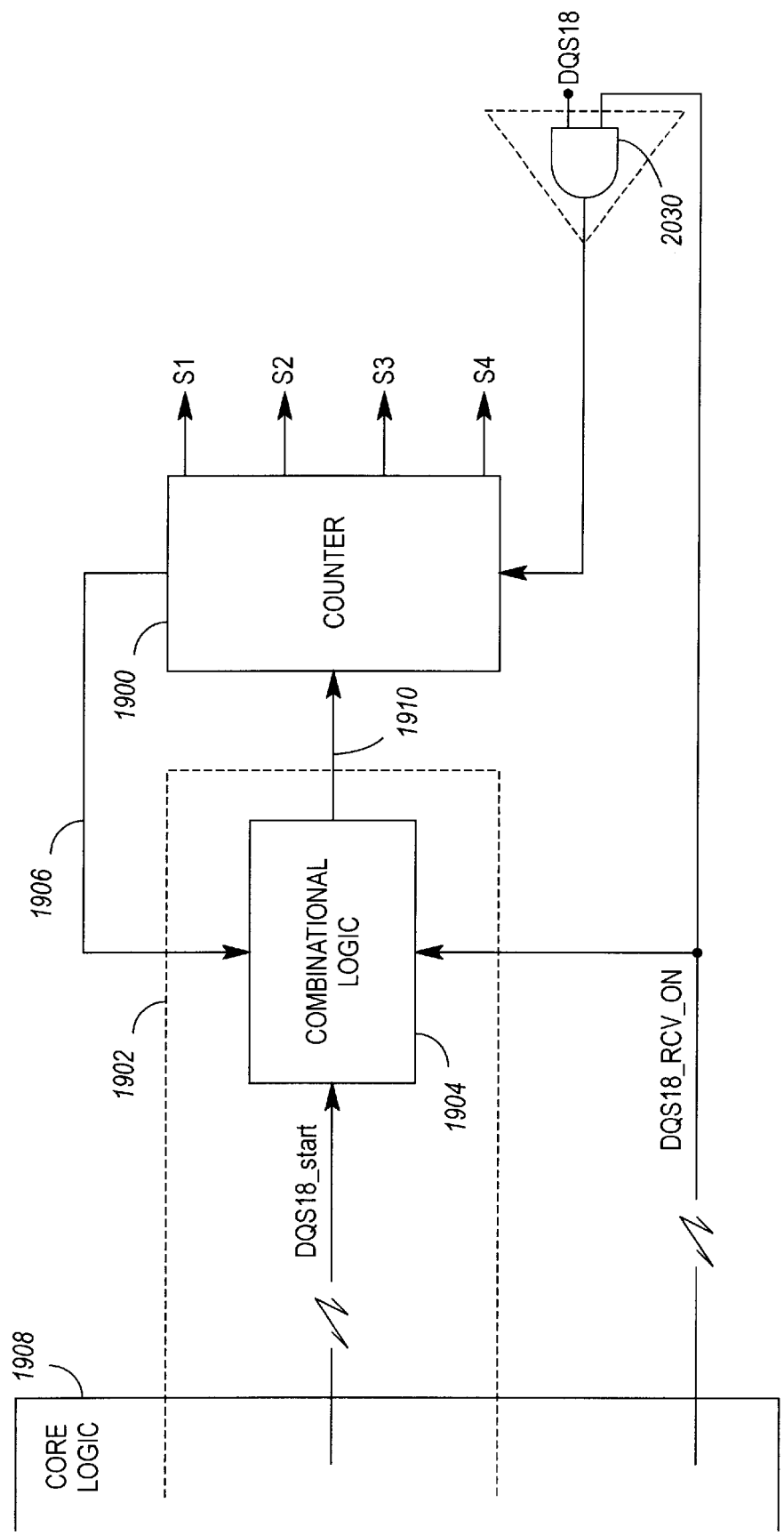
FIG. 19 illustrates a first preferred embodiment of a memory controller's strobe receiver circuitry.
Figure 20:
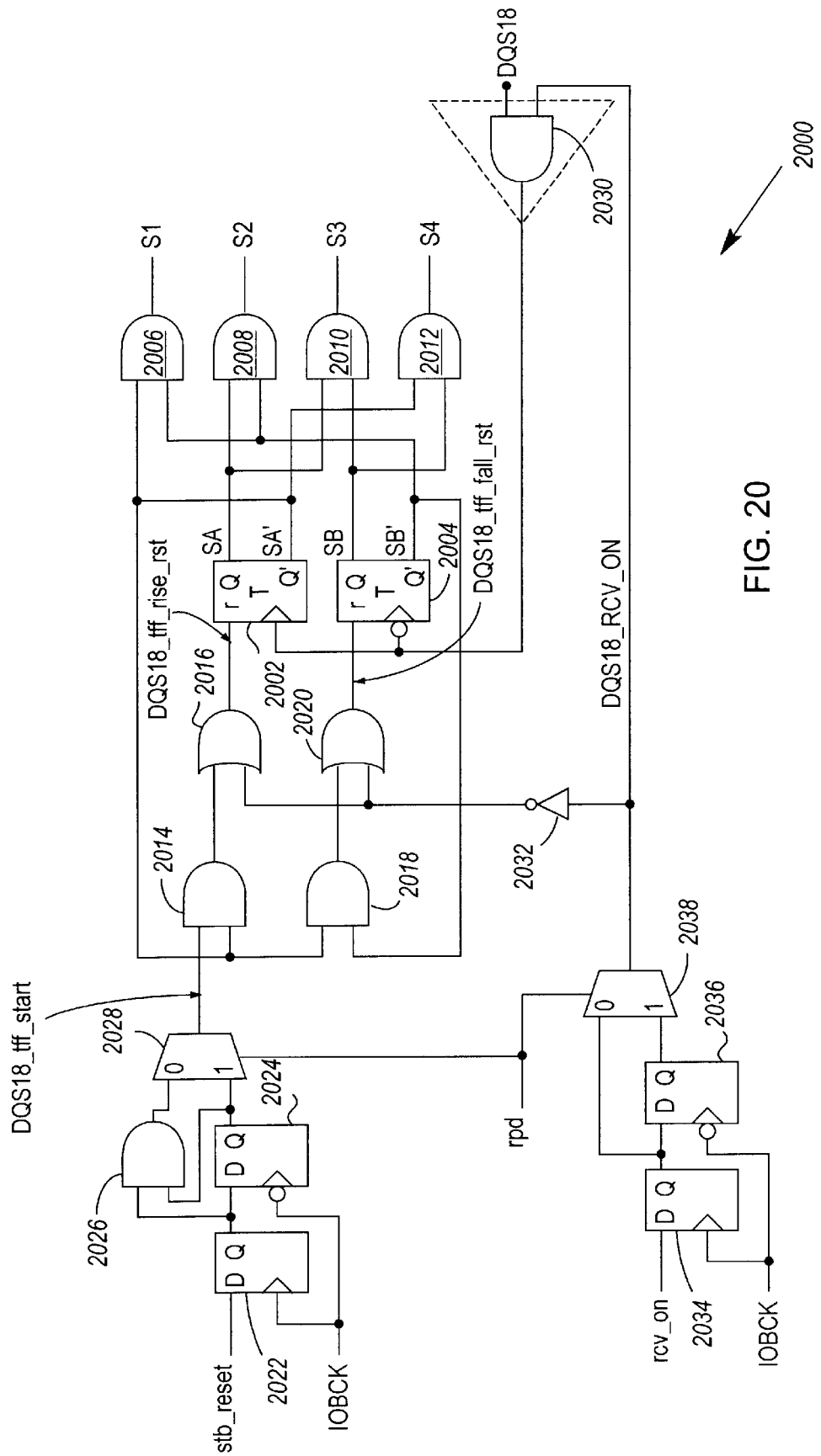
FIG. 20 illustrates a second preferred embodiment of a memory controller's strobe receiver circuitry.
Figure 22:
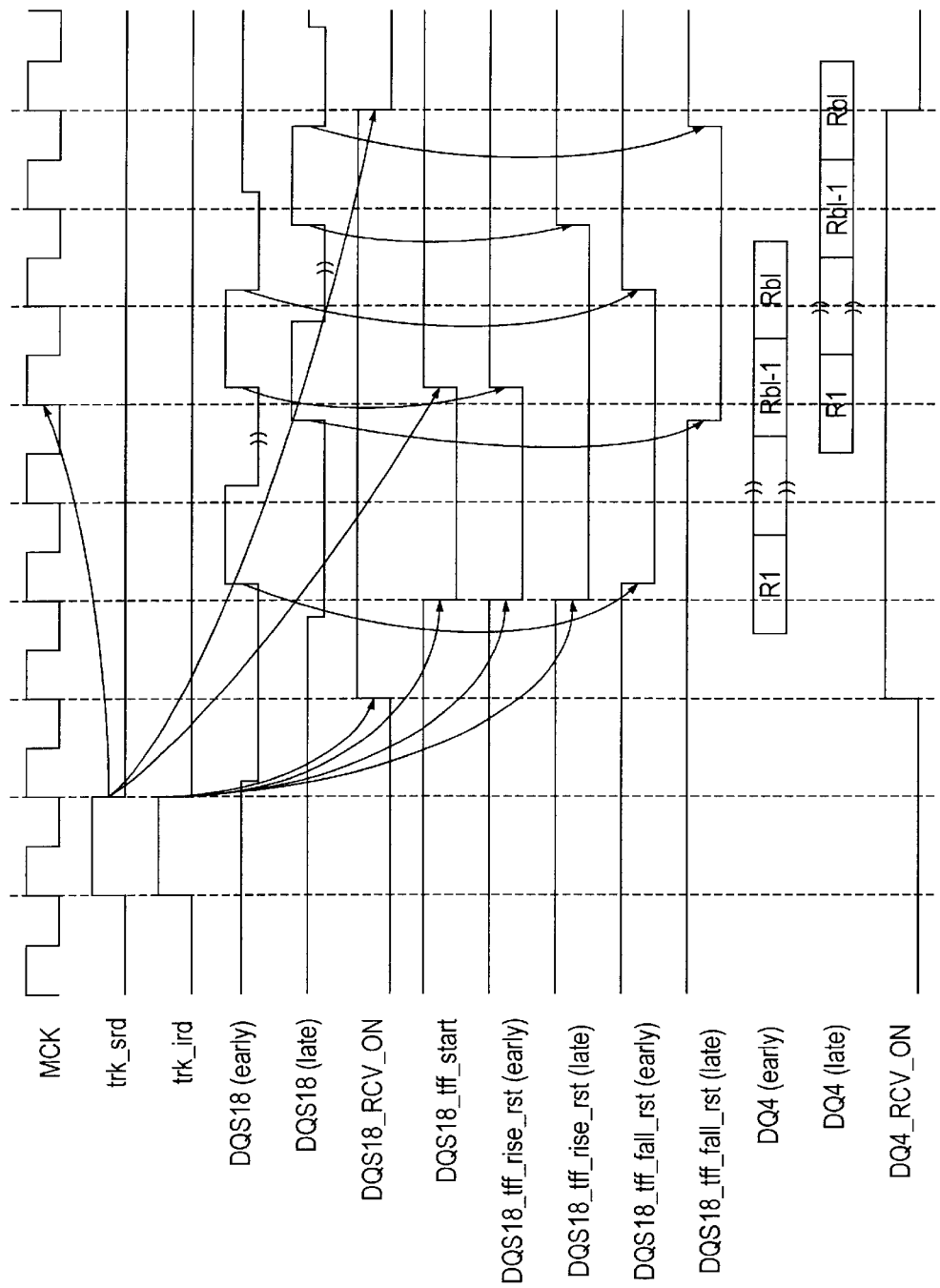
FIG. 22 illustrates read timings of the receiver circuitry shown in FIGS. 18,19 and 28 when configured in 1x mode with rpd=0.

FIG. 22 illustrates a DDR read cycle in 1x mode (data2xn1x=0) with no read phase delay (rpd=0), as seen by the FIGS. 18 and 20 receiver circuitry 1800, 2000. Note the variation between signals DQS18 (early) and DQS18 (late), which respectively represent the earliest and latest expected arrival of strobe edges at strobe pad DQS18 (i.e., an "early receipt case" and a "late receipt case"). Note also that the "0" to tri-state strobe transition in the early receipt case occurs before the last strobe edge is received in the late receipt case. Therefore, unless one can predict in advance exactly when strobe signals will be received at a strobe pad (i.e., early or late), and make such a prediction with perfect accuracy, then one cannot, in all cases, tri-state a strobe pad's receiver both 1) after its receipt of a last incoming strobe edge, and 2) before an incoming strobe signal tri-states. As one of ordinary skill in the art will readily comprehend, predicting when strobe signals will be received at a strobe pad is extremely difficult, as such a prediction depends not only on wire routes between a controller 100 and memory 104, as well as the time it takes to access a particular memory address within a memory module, but also on temperature, clock skew, memory access speeds, and so on. A way of preventing the tri-stating of a strobe signal from producing noise which is interpreted as active strobe edges is therefore needed. FIGS. 18, 19 & 20 illustrate such a means.

In FIG. 18, four data input latches 1802–1808 are coupled to receive data from data pad DQ4. The four latches 1802–1808 are respectively controlled by values of a count. For example, in FIG. 18, the four latches 1802–1808 are controlled by a four bit, one-high count comprising bits S1, S2, S3 and S4. This count may be produced by the counter 1900 illustrated in FIG. 19, in response to buffered strobe edges output from a receiver 2030 which is coupled to the strobe pad DQS18. The counter is controlled by counter control logic 1902 comprising a block of combinational logic 1904 and a portion of the memory controller's core logic 1908. The combinational logic 1904 receives a control signal (DQS18_start), feedback 1906 from the counter 1900, and the enable signal DQS18_RCV_ON. The enable signal DQS18__RCV__ON is provided to both the combinational logic 1904 of the counter control logic 1902, as well as the receiver 2030 which buffers strobe edges received at strobe pad DQS18, so that the strobe receiver circuitry shown in FIG. 19 may be globally enabled similarly to the way in which the FIG. 18 data receiver circuitry is enabled.

The combinational logic's primary control inputs are the control signal DQS18__start and the counter feedback 1906. Assuming that 1) DQS18__RCV__ON is asserted, and 2) the counter 1900 is in reset, then the control signal DQS18__start determines when the counter 1900 is enabled. In a first preferred embodiment, the control signal DQS18__start is merely a pulse of fixed width which is generated prior to each read cycle of the memory controller 100. In this first preferred embodiment, each strobe signal received at DQS18 is presumed to have the same number of edges. In a second preferred embodiment, the control signal DQS18__start comprises a start condition (e.g., a falling edge) and a stop condition (e.g., a rising edge), with the timing of the start and stop conditions varying depending on the number of strobe edges which are expected to be received during a current read cycle. In this manner, the core logic 1908 can time the start and stop conditions depending on whether a current read cycle is, for example, 1) a DDR burst of four or burst of eight read cycle, or 2) a 2x mode or Mx mode DDR read cycle (M≧2). The latter embodiment of the control signal DQS18__start therefore provides a memory controller 100 with greater read flexibility.

FIG. 20 illustrates a preferred and more detailed embodiment of the circuitry illustrated in FIG. 19, wherein signals S1–S4 are produced by a rollover counter 2002–2012 which increments its four bit, one-high count in response to each strobe edge received at strobe pad DQS18. The rollover counter 2002–2012 is enabled and reset by counter control logic 2014–2028 which is coupled to DQS18__tff__rise__rst and DQS18__tff__fall__rst inputs of the counter 2002–2012. During a read cycle, the counter control logic 2014–2028 generates a start condition at DQS18__tff start (a falling edge in FIG. 20), to thereby enable the counter's counting of strobe edges. That is, assuming that the counter 2002–2012 is already in reset. The counter control logic 2014–2028 then assists in resetting the counter 2002–2012 by generating a stop condition (a rising edge in FIG. 20) at DQS18__tff__start.

As will be explained in more detail below, the start condition serves to enable the counter 2002–2012 asynchronously with respect to the strobe edges which are received at strobe pad DQS18.

The counter 2002–2012 is also asynchronously reset with respect to strobe edges received at strobe pad DQS18. The counter 2002–2012 is reset in response to the stop condition and counter feedback. Note that in FIG. 22, the stop condition is generated in the midst of a read cycle, and during the counter's counting of a read cycle's last four strobe edges (i.e., a last P strobe edges in the claims). However, due to counter feedback received at inputs of logic gates 2014 and 2018 of the counter control logic 2014–2028, the counter 2002–2012 continues counting the last four strobe edges of a received strobe signal before entering a reset state—even though the counter 2002–2012 has already received a stop condition. The stop condition therefore does not immediately stop the counter 2002–2012, but rather prevents the counter 2002–2012 from counting past the last four strobe edges of a received strobe signal. As will be understood shortly, the counter 2002–2012 will count the last four strobe edges regardless of where it is in its count when a stop condition is generated. Thus, regardless of whether the counter 2002–2012 has counted one, two or three of the last four strobe edges when a stop condition is generated, the counter will finish counting the last four strobe edges of a strobe signal and then stop counting. As a result, so long as the last four strobe edges of DQS18 (early) overlap the last four strobe edges of DQS18 (late), a time can be found to assert DQS18__tff__start such that 1) all strobe edges will be counted, and 2) the counter 2002–2012 will be reset prior to when a strobe bus is tri-stated.

In FIG. 20, the rollover counter comprises two state elements 2002, 2004. The state elements are preferably toggle flip-flops 2002, 2004 which produce an arithmetic binary count (SA:SB). The counter also comprises combinational logic 2006–2012 which converts the aforementioned arithmetic binary count to a four bit, one-high binary count.

The first of the two flip-flops 2002 produces outputs SA and SA' and is clocked by rising strobe edges. The second of the two flip-flops 2004 produces outputs SB and SB' and is clocked by falling strobe edges.

Downstream from the counter's two flip-flops 2002, 2004, the combinational logic which converts the flip-flops' arithmetic binary count to a one-high binary count comprises four AND gates 2006–2012. The inputs of the four AND gates 2006–2012 are tied to various ones of the outputs SA, SA', SB and SB' such that the AND gates 2006–2012 assert their outputs S1–S4 in a sequential and rollover manner.

If the flip-flop 2002 which produces output SA is considered to be the low order flip-flop of the counter 2002–2012, then the binary count which is produced by the counter's flip-flops 2002, 2004 will assume the following sequence: 0, 1, 3, 2, 0, 1, 3, 2, 0, ... Thus, the order of the counter's count is not as important as the consistent and repetitive nature of the counter's count. Also, although the counter shown in FIG. 20 is a rollover counter 2002–2012, the counter can take other forms. For example, the counter could comprise additional state elements 2002, 2004 or output logic 2006–2012 for counting all strobe edges of a strobe signal, without needing to roll over during a given count.

The counter control logic 2014–2028 which enables and resets the counter comprises a pair of AND gates 2014, 2018 which are respectively coupled to the reset inputs of the two flip-flops 2002, 2004 via an optional pair of OR gates 2016, 2020. The purpose of the optional OR gates 2016, 2020 will be described shortly. By means of a first AND and OR gate 2014, 2016, the first flip-flop's reset input is defined by the equation:

SA'.DQS18__tff__start (where "." indicates a logical AND operation).

By means of a second AND and OR gate 2018, 2020, the second flip-flop's reset input is determined by the equation:

SA'.SB'.

Thus, each of the AND gates 2014, 2018 receives feedback from the counter 2002–2012 (i.e., "counter feedback"). The first AND gate 2014, however, also receives the start and stop conditions which are generated at DQS18__tff__start.

The start and stop conditions which assist in respectively enabling and resetting the counter 2002–2012 are generated on the single signal line labeled DQS18__tff__start. A start condition is denoted by a falling edge at DQS18__tff__start, and a stop condition is denoted by a rising edge at DQS18__ tff_start. The start and stop conditions are generated by logic comprising a multiplexer 2028, an AND gate 2026, and two alternately clocked D-type flip-flops 2022, 2024. The flip-flops 2022, 2024 and AND gate 2026 are coupled such that the multiplexer 2028 receives the signal stb_reset at each of its inputs, but receives changes in the stb_reset signal at its "0" input ½ IOBCK cycle after it receives changes in the stb_reset signal at its "1" input. The state of the multiplexer 2028 is controlled by the read phase delay signal (rpd), and as a result, a change in stb_reset is reflected at DQS18_tff_start ½ IOBCK cycle later when there is a read phase delay (i.e., when rpd=1).

During a read cycle, each of the counter control logic's two OR gates 2008, 2012 receives a logic "0" derived from the inverse of the DQS18_RCV_ON signal. One will note that DQS18_RCV_ON is the signal which controls the receiver 2030 coupled to the DQS18 strobe pad. DQS18_RCV_ON is therefore asserted during a read cycle, and deasserted between read cycles. By coupling DQS18_RCV_ON to the counter's two OR gates 2008, 2012 via an inverter 2032, an extra safety measure is provided to ensure that none of the counter's outputs (i.e., S1–S4) is asserted unintentionally. Furthermore, the assertion of DQS18_RCV_ON can be used to reset the counter 2002–2012 upon power on.

The state of signal DQS18_RCV_ON is controlled similarly to the state of signal DQS18_tff_start. That is, the state of DQS18_RCV_ON is controlled by two alternately clocked D-type flip-flops 2034, 2036 which are coupled to the inputs of a multiplexer 2038, which multiplexer is controlled by the rpd signal. Thus, a change in the state of DQS18_RCV_ON will be delayed by ½ IOBCK cycle when there is a read phase delay.

One skilled in the art will readily comprehend that the FIGS. 18 & 20 circuitry can be extrapolated to receive data bits and strobe edges consisting of a multiple of P data bits and strobe edges. In such an extrapolation, the counter 2002–2012 is expanded to produce a P bit, one-high count. Likewise, the number of data input latches 1802–1808 may be expanded to P latches. Thus, in FIGS. 18 & 20, P=4.

Figure 23:
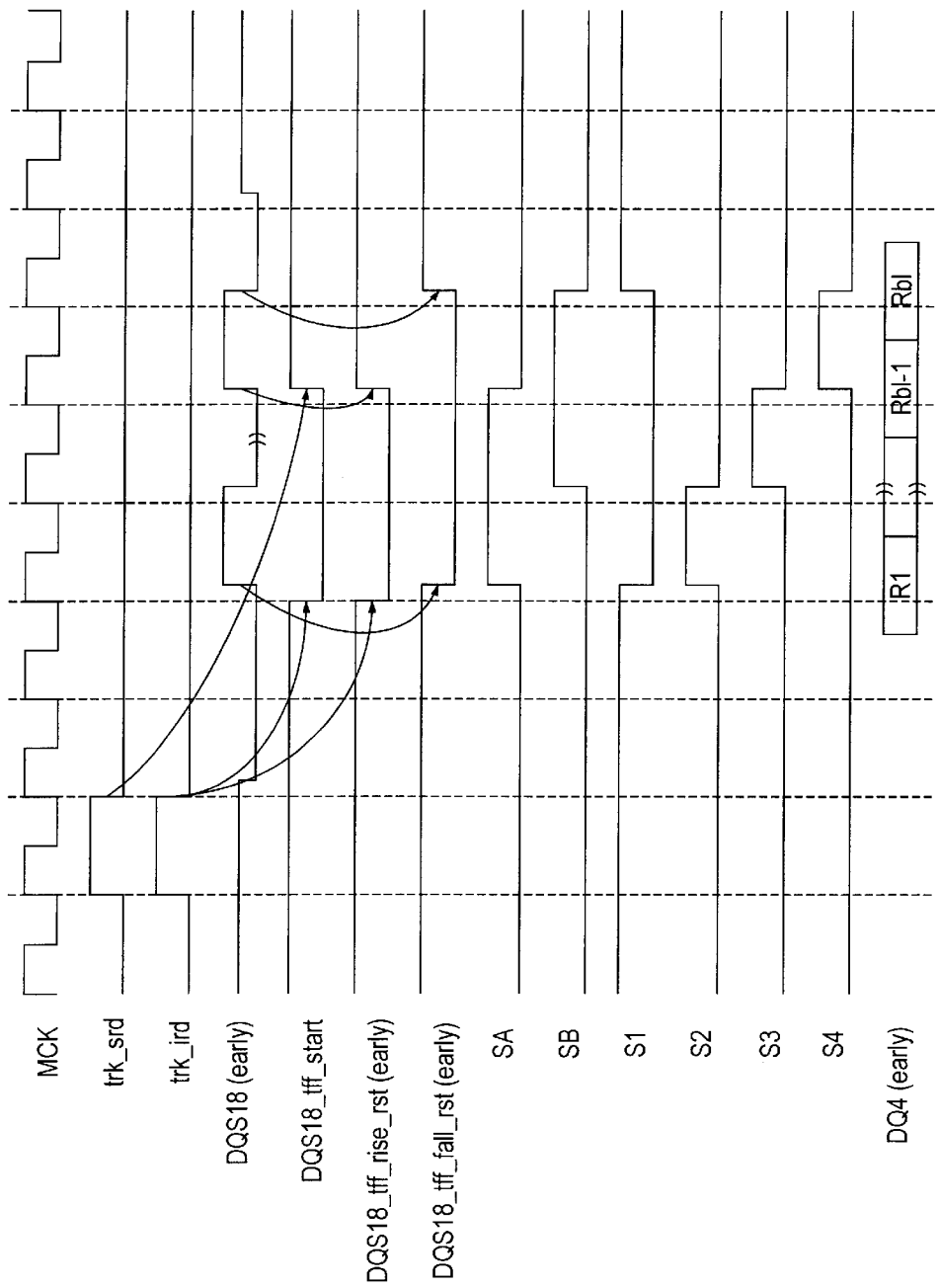
FIG. 23 illustrates greater details of the "early" 1x mode read case illustrated in FIG. 22.
Figure 24:
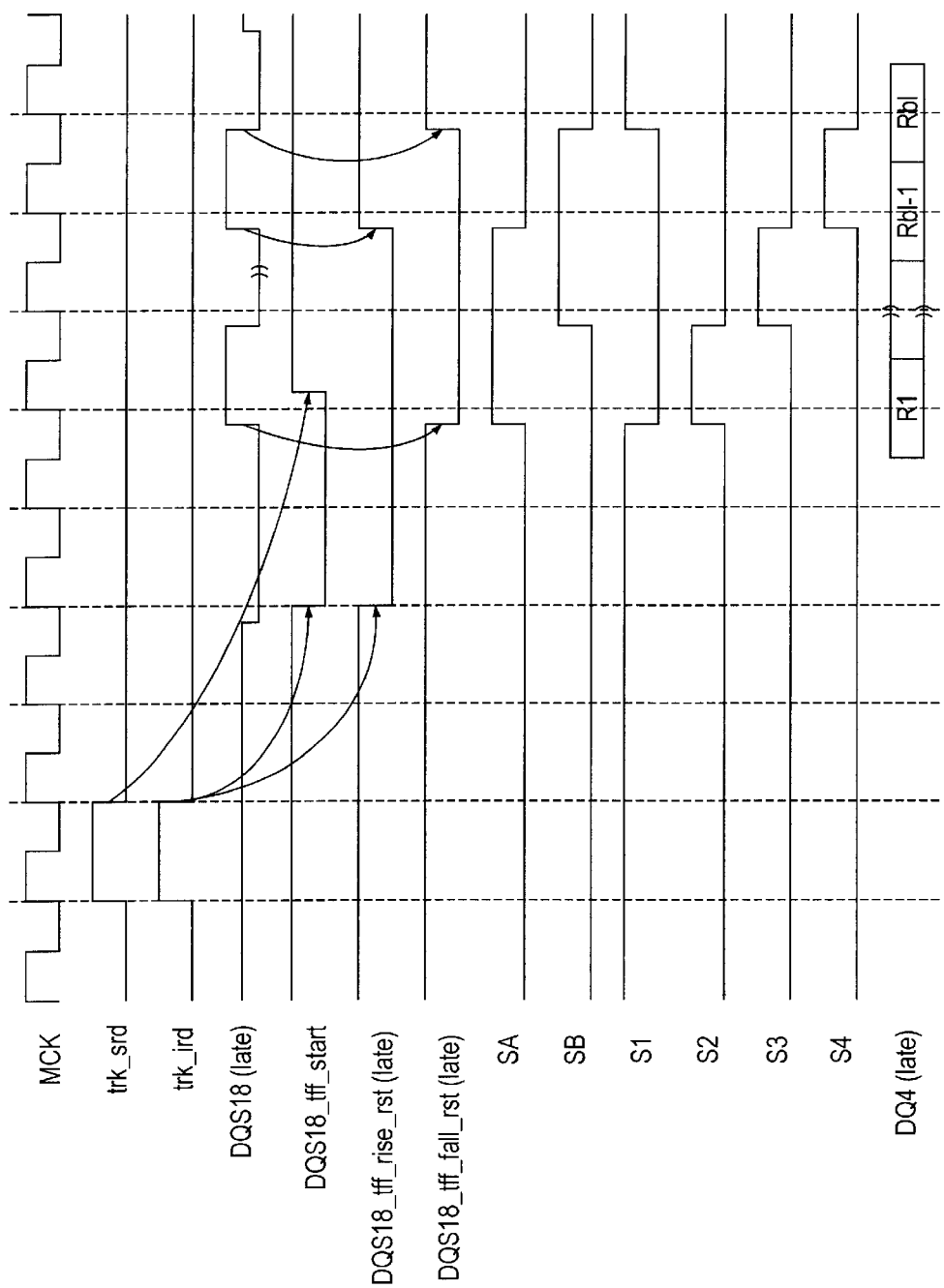
FIG. 24 illustrates greater details of the "late" 1x mode read case illustrated in FIG. 22.
Figure 25:
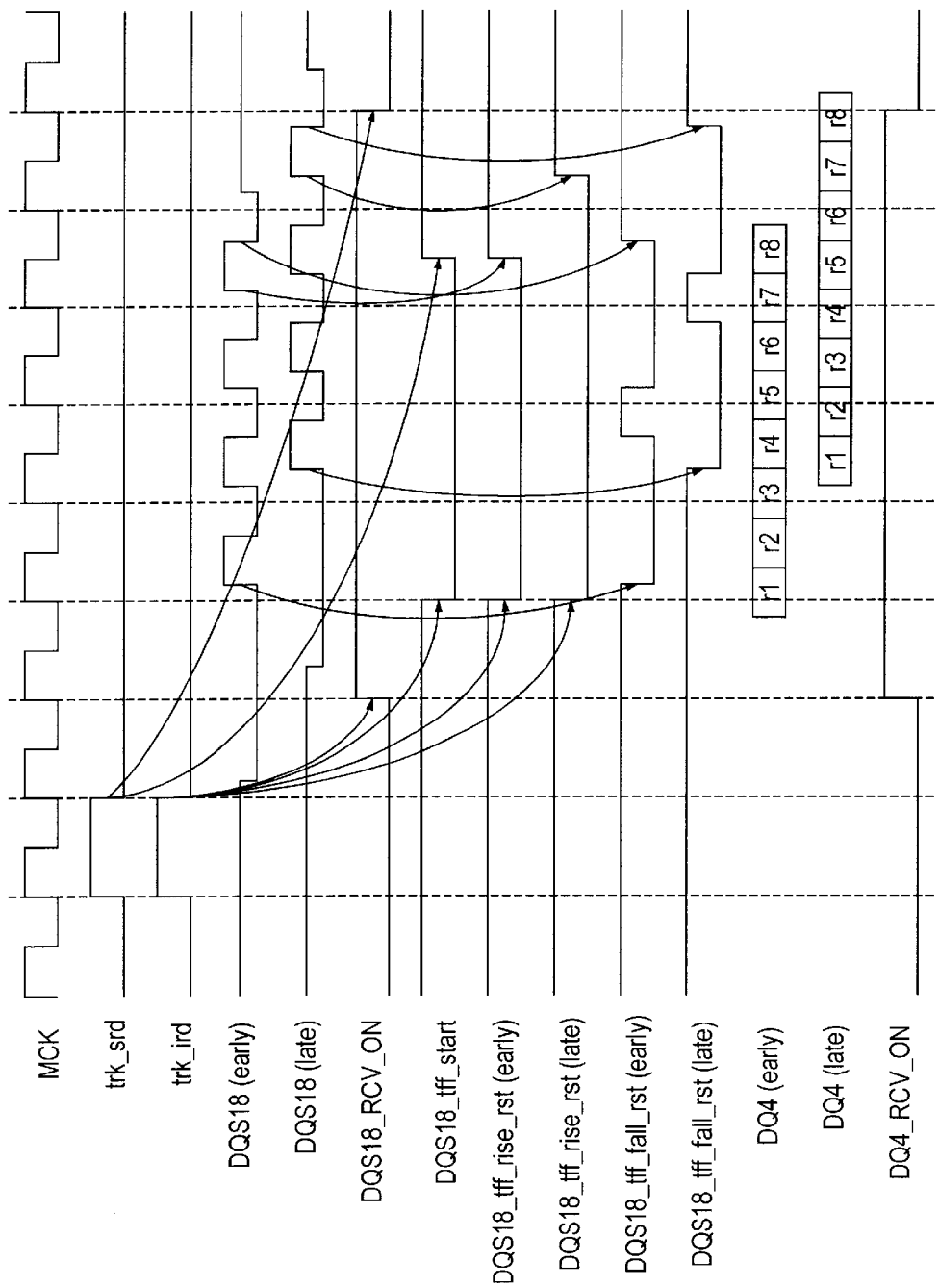
FIG. 25 illustrates read timings of the receiver circuitry shown in FIGS. 18,19 and 28 when configured in 2x mode with rpd=0.
Figure 26:
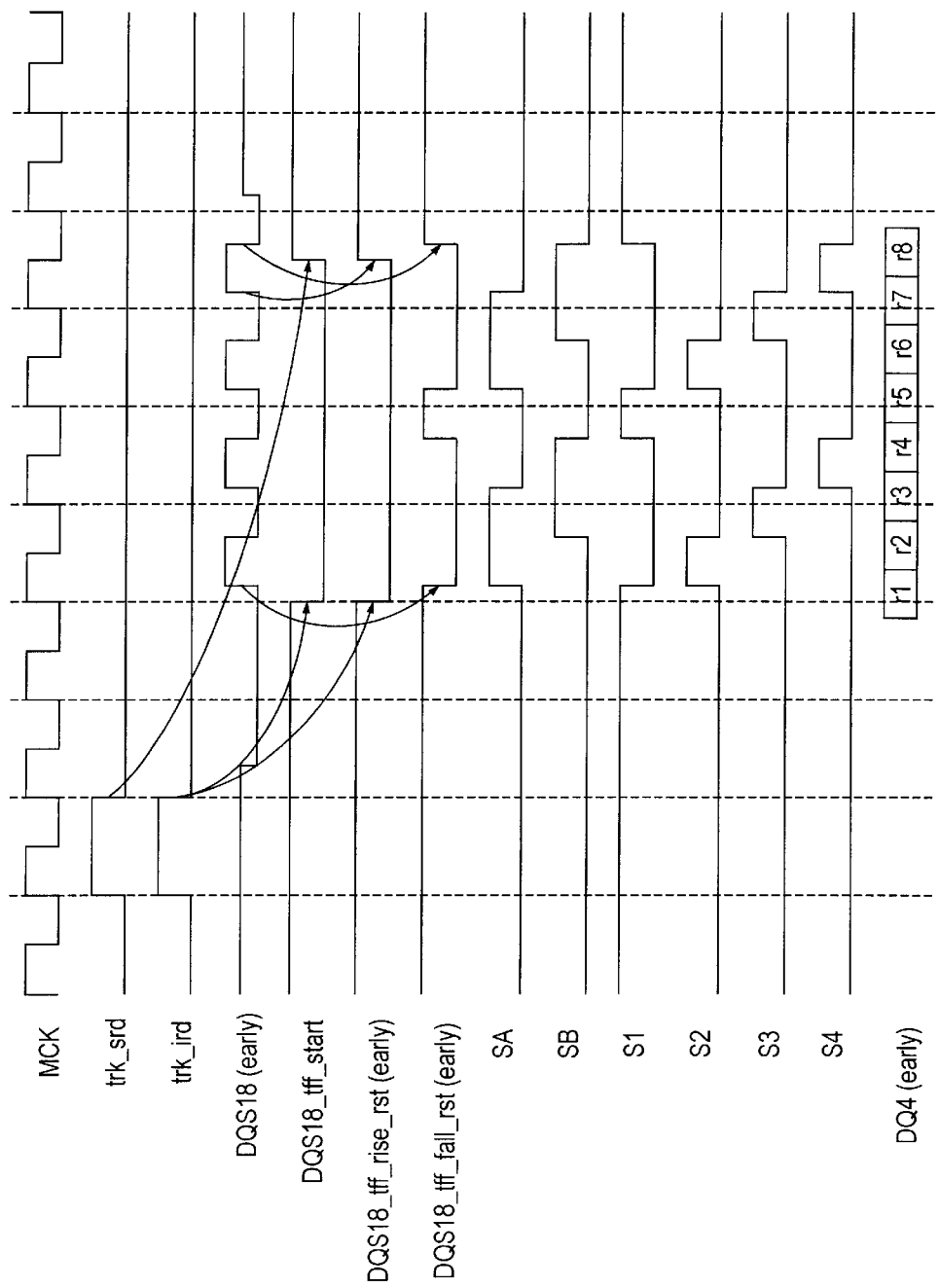
FIG. 26 illustrates greater details of the "early" 2x mode read case illustrated in FIG. 25.
Figure 27:
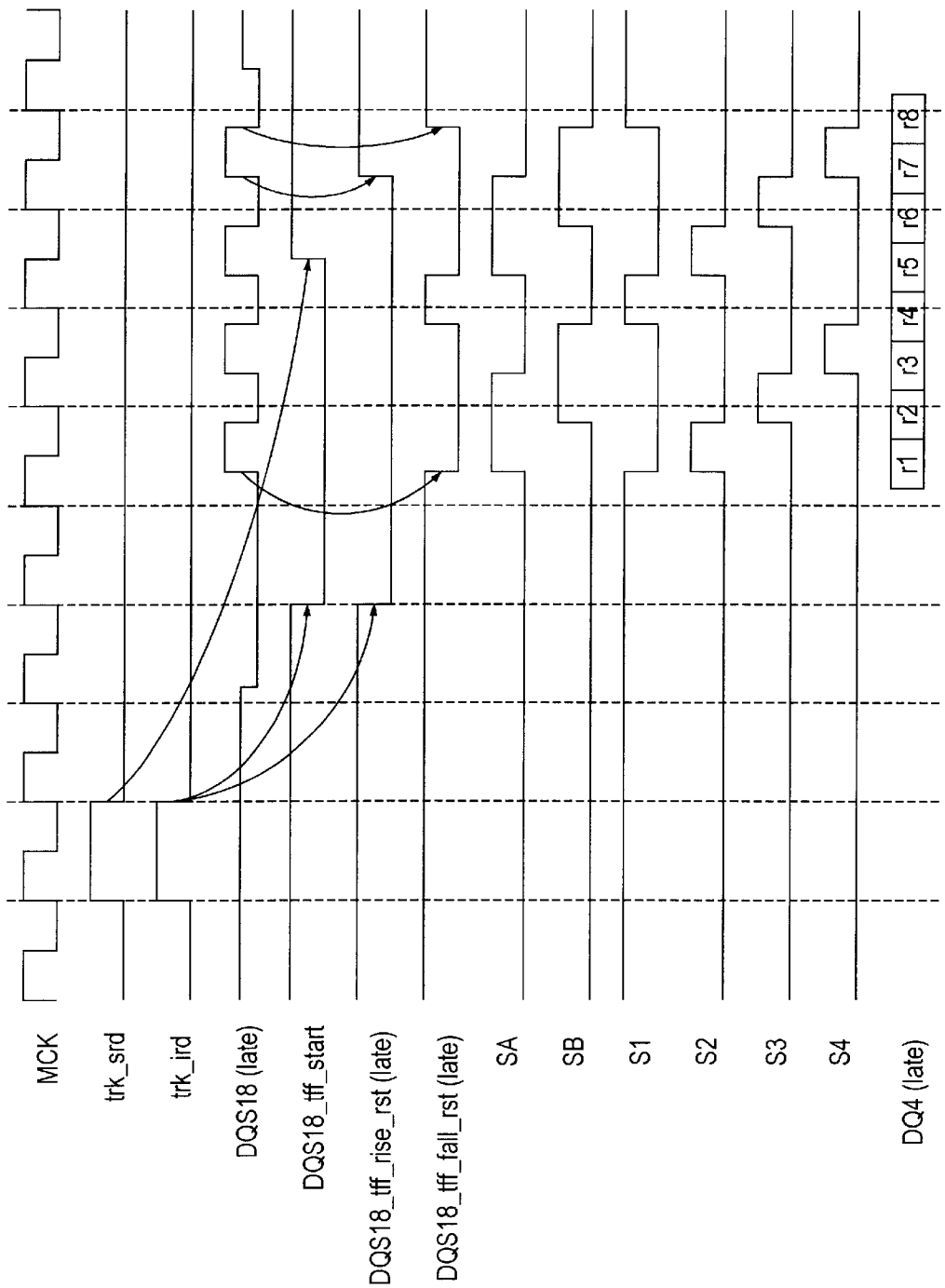
FIG. 27 illustrates greater details of the "late" 2x mode read case illustrated in FIG. 25.

The operation of the receiver circuitry 2000 illustrated in FIG. 20 can be better understood by referring to FIGS. 22–27. FIG. 22 provides a comparison of various signal timings for early and late case reads in 1x mode with no read phase delay (rpd=0). Similarly, FIG. 25 provides a comparison of various signal timings for early and late case reads in 2x mode with no read phase delay (rpd=0). FIGS. 23, 24, 26 and 27 show the following:

FIG. 23: signal timings in 1x mode, early case, rpd=0
FIG. 24: signal timings in 1x mode, late case, rpd=0
FIG. 26: signal timings in 2x mode, early case, rpd=0
FIG. 27: signal timings in 2x mode, late case, rpd=0

A. 1x READ CYCLES

Referring now to FIG. 22, there is shown the core clock, MCK, of the memory controller 100 illustrated in FIGS. 9, 18 and 20. The signals trk_ird and trk_srd are provided to a pad control state machine 2900 (FIG. 29) which respectively generates the stb_reset signal provided to flip-flop 2022, as well as the rcv_on signal provided to flip-flop 2034. The trk_srd and trk_ird signals therefore determine the rise and fall of various strobe receiver circuitry signals. Although not shown in FIG. 29, the pad control state machine also receives signals which indicate whether a current read cycle is to assume a 1x or 2x mode, and a burst of 4 or burst of 8 mode. These additional signals, in turn, determine when stb_reset and rcv_on are asserted.

As illustrated in FIG. 22, the assertion of the trk_ird signal determines the rise of DQS18_RCV_ON and the fall of DQS18_tff_start (with the fall of DQS18_tff_start representing the afore-mentioned start condition). If the counter 2002–2012 is in reset (as it should be when trk_ird is asserted), then the assertion of trk_ird also determines the fall of DQS18_tff_rise_rst.

Note that the fall of DQS18_RCV_ON enables the FIG. 20 strobe receiver circuitry 2000 in general, but does not enable the circuitry's counter 2002–2012. However, with the fall of DQS18_tff_start and DQS18_tff_rise_rst one cycle after the rise of DQS18_RCV_ON, the counter 2002–2012 is placed in a state wherein it is ready to begin counting strobe edges as soon as they are received (i.e., the counter 2002–2012 is asynchronously enabled in response to a start condition and counter feedback).

Preferably, the counter 2002–2012 is enabled at a time falling between i) a latest time when the counter control logic 2014–2028 expects a strobe bus coupled to strobe pad DQS18 to leave tri-state, and ii) an earliest time when the counter control logic 2014–2028 expects edges of a strobe signal to be received at strobe pad DQS18. Thus, with respect to the strobe receiver circuitry's receipt of strobes conforming to the JEDEC DDR SDRAM Specification, the counter 2002–2012 is preferably enabled at a time in which the counter control logic 2014–2028 expects both DQS18 (early) and DQS18 (late) to be in their preamble state. In this manner, erroneous transitions at strobe pad DQS18 as a result of tri-state noise will not be interpreted by the counter 2002–2012 as active strobe edges.

The assertion of the trk_srd signal determines the rise of DQS18_tff_start, as well as the fall of DQS18_RCV_ON (which fall disables the FIG. 20 strobe receiver circuitry 2000 in its entirety). The rise of DQS18_tff_start and fall of DQS18_RCV_ON vary in timing depending on whether a read cycle is a burst of four or burst of eight cycle, as controlled by the pad control state machine 2900. As will be noted during this description's discussion of a 2x mode read cycle, the timing of the trk_srd control pulse is fixed in 2x mode as a result of a decision being made to only support burst of eight reads in 2x mode.

Note that during a 1x mode burst of four read cycle, DQS18_tff_start may be timed to rise anytime between the first rising edge of DQS18 (late) and the end of the DQS18 (early) postamble. So long as DQS18_tff_start rises during this period, the counter 2002–2012 will count each and every active strobe signal received at DQS18 and then asynchronously reset itself in response to the rise of DQS18_tff_start (i.e., a stop condition) and counter feedback. Phantom strobe edges which are produced as a result of noise as DQS18 (early) tri-states will therefore not be counted by the counter 2002–2012. Consequently, the four data input latches 1802–1808 which are coupled to data pad DQ4 will not be clocked inadvertently.

The fall of DQS18_tff_start, the fall of DQS18_tff_rise_rst, and the rise of DQS18_RCV_ON are all triggered in the clock domain of memory controller 100. All other rising and falling edges within the strobe receiver circuitry 2000 are triggered off of strobe edges received at the DQS18 strobe pad, and are therefore triggered in the strobe domain of the memory modules 104 or intermediate chips 302 to which the DQS18 strobe pad is attached.

As shown in FIG. 22, the first falling edge of DQS18_tff_fall_rst is triggered off of the FIG. 20 counter's receipt of a first strobe edge. Thereafter, the counter 2002–2012 continues to count strobe edges until such time that the DQS18_tff_start signal is asserted. After this point, and upon reaching count "3" (i.e., the third of the last four strobe edges), the rise of DQS18_tff_rise_rst is asynchronously triggered in response to counter feedback. Likewise, and upon reaching count "2", the rise of DQS18_tff_fall_rst is asynchronously triggered as a result of counter feedback. Once DQS18_tff_rise_rst and DQS18_tff_fall_rst rise, they are prevented from falling so long as DQS18_tff_start is held high (i.e., until a next read cycle is initiated).

For completeness, FIG. 22 illustrates the receipt of data at data pad DQ4 (FIG. 18) in an "early receipt case" and "late receipt case" (i.e., DQ4 (early) and DQ4 (late)). FIG. 22 also illustrates the period over which the DQ4 data pad is enabled for receiving data (denoted by the assertion of signal DQ4_RCV_ON).

FIG. 23 illustrates signal timings in the 1x mode early read case with no read phase delay (rpd=0). Note that the overlapping assertions and deassertions of flip-flop outputs SA and SB lead to a production of S1–S4 signals with consecutive pulses. Each S1–S4 pulse is produced at the frequency of an incoming strobe signal received at strobe pad DQS18.

FIG. 24 illustrates signal timings in the 1x mode late read case with no read phase delay (rpd=0).

B. 2x Read Cycles

Referring now to FIG. 25, there is once again shown the core clock, MCK, of the memory controller 100 illustrated in FIGS. 9, 18 and 20.

As illustrated in FIG. 25, the assertion of the trk_ird signal determines the rise of DQS18_RCV_ON and the fall of DQS18_tff_start (with the fall of DQS18_tff_start representing the afore-mentioned start condition). If the counter is in reset (as it should be when trk_ird is asserted), then the assertion of trk_ird also determines the fall of DQS18_tff_rise_rst.

Note that the fall of DQS18_RCV_ON enables the FIG. 20 strobe receiver circuitry 2000 in general, but does not enable the circuitry's counter 2002–2012. However, with the fall of DQS18_tff_start and DQS18_tff_rise_rst one cycle after the rise of DQS18_RCV_ON, the counter 2002–2012 is placed in a state wherein it is ready to begin counting strobe edges as soon as they are received (i.e., the counter 2002–2012 is asynchronously enabled in response to a start condition and counter feedback).

Preferably, the counter 2002–2012 is enabled at a time falling between i) a latest time when the counter control logic 2014–2028 expects a strobe bus coupled to strobe pad DQS18 to leave tri-state, and ii) an earliest time when the counter control logic 2014–2028 expects edges of a strobe signal to be received at strobe pad DQS18. Thus, with respect to the strobe receiver circuitry's receipt of strobes conforming to the JEDEC DDR SDRAM Specification, the counter 2002–2012 is preferably enabled at a time in which the counter control logic 2014–2028 expects both DQS18 (early) and DQS18 (late) to be in their preamble state. In this manner, erroneous transitions at strobe pad DQS18 as a result of tri-state noise will not be interpreted by the counter 2002–2012 as active strobe edges.

The assertion of the trk_srd signal determines the rise of DQS18_tff_start, as well as the fall of DQS18_RCV ON (which fall disables the FIG. 20 strobe receiver circuitry 2000 in its entirety). Since the memory controller 100 does not communicate directly with memory 104 in 2x mode, 2x reads preferably always assume a burst of eight form, and thus the rise of DQS18_f_start and fall of DQS18_RCV_ON have fixed timings in 2x mode.

Note that during a 2x mode read cycle, DQS18_tff_start may be timed to rise anytime between the third rising edge of DQS18 (late) and the end of the DQS18 (early) post-amble. So long as DQS18_tff_start rises during this period, the counter 2002–2012 will count each and every active strobe signal received at DQS18 and then asynchronously reset itself in response to the rise of DQS18_tff_start (i.e., a stop condition) and counter feedback. Phantom strobe edges which are produced as a result of noise as DQS18 (early) tri-states will therefore not be counted by the counter 2002–2012. Consequently, the four data input latches 1802–1808 which are coupled to data pad DQ4 will not be clocked inadvertently.

As in 1x mode, the rise of DQS18_RCV_ON, the fall of DQS18_tff_start, and the fall of DQS18_tff_rise_rst are all triggered in the clock domain of memory controller 100. All other rising and falling edges within the strobe receiver circuitry 2000 are triggered off of strobe edges received at the DQS18 strobe pad, and are therefore triggered in the strobe domain of the memory modules 104 or intermediate chips 302 to which the DQS18 strobe pad is attached.

As shown in FIG. 25, the first falling edge of DQS18_tff_fall_rst is triggered off of the FIG. 20 counter's receipt of a first strobe edge. Thereafter, the counter 2002–2012 continues to count strobe edges until such time that the DQS18_tff_start signal is asserted. After this point, and upon reaching count "3" (i.e., the third of the last four strobe edges), the rise of DQS18_tff_rise_rst is asynchronously triggered in response to counter feedback. Likewise, and upon reaching count "2", the rise of DQS18_tff_fall_rst is asynchronously triggered as a result of counter feedback. Once DQS18_tff_rise_rst and DQS18_tff_fall_rst rise, they are prevented from falling so long as DQS18_tff_start is held high (i.e., until a next read cycle is initiated).

For completeness, FIG. 25 illustrates the receipt of data at data pad DQ4 (FIG. 18) in an "early receipt case" and "late receipt case" (i.e., DQ4 (early) and DQ4 (late)). FIG. 22 also illustrates the period over which the DQ4 data pad is enabled for receiving data (denoted by the assertion of signal DQ4_RCV_ON).

FIG. 26 illustrates signal timings in the 2x mode early read case with no read phase delay (rpd=0). Note that the overlapping assertions and deassertions of flip-flop outputs SA and SB lead to a production of S1–S4 signals with repetitive and consecutive pulses. Each pulse is produced at the frequency of a strobe signal received at the DQS18 strobe pad, ane each pulse latches a new data bit (i.e., r1, r2, r3, r4, r5, r6, r7 or r8) into the DQ4 receiver circuitry 1800 (see FIG. 18).

FIG. 27 illustrates signal timings in the 2x mode late read case with no read phase delay (rpd=0).

7. Ability to Read DIMMs Comprised of ×4, ×8 and ×16 RAM Devices

Figure 28:
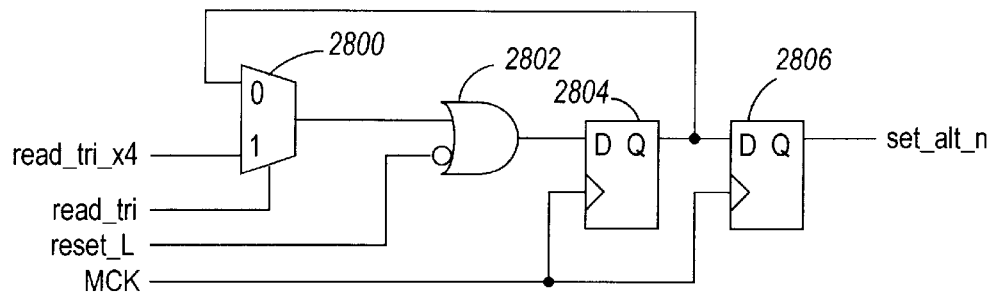
FIG. 28 illustrates a preferred embodiment of a circuit for providing the set_alt_n signal which appears in the FIG. 18 memory controller receiver circuitry.

By means of the memory map 1100 illustrated in FIG. 11, the data/strobe pairings illustrated in FIGS. 9 & 10, and the control circuitry 1810, 1812, 2800–2806 illustrated in FIGS. 18 & 28 (which control circuitry has yet to be discussed), the memory controller 100 illustrated in FIG. 9 is able to read data from memory modules 104 comprised of non-homogeneous data width RAM devices (e.g., DIMMs comprised of ×4 DDR SDRAMs, DIMMs comprised of ×8 DDR SDRAMs, and DIMMs comprised of ×16 DDR SDRAMs).

As previously discussed with respect to writes of DIMMs 104 comprised of non-homogeneous data width RAM devices, the memory map 1100 stores an indication of a data/strobe ratio (e.g., a value $A_x$) for each memory module x which is coupled to the memory controller 100. During a read cycle of the memory controller 100, an addressed value $A_x$ is output from the memory map 1100 and provided to control circuitry 1810, 1812, 2800–2806 which controls data receipt at a subset of the memory controller's data pads. In FIG. 18, the control circuitry is shown to comprise a number of multiplexers 1812, each of which receives an addressed value $A_x$ (in the form of signal set_alt_n) as a control input.

In general, the control circuitry 1810, 1812, 2800–2806 controls data receipt at a subset of the memory controller's data pads as is discussed in previous sections of this description. That is, a count of strobe edges received at one of a memory controller's strobe pads (e.g., DQS18) is used to control the data storage elements (e.g., data latches 1802–1808) coupled to one or more of the memory controller's data pads (e.g., DQ4–DQ7; FIGS. 9 & 18). For example, four data input latches 1802–1808 may be coupled to each data pad of a memory controller 100, and the bits of a four bit, one-high strobe edge count may be used to control respective ones of the latches 1802–1808. Likewise, each bit of a four-bit, one-high strobe edge count may control corresponding data input latches 1802–1808 coupled to each of a number of data pads (e.g., pads DQ4–DQ7).

While the above paragraph has summarized a preferred and previously described method of controlling the receipt of data at a number of data pads, the afore-mentioned method of controlling data receipt can be accomplished without the multiplexer 1812 which couples the data and strobe receiver circuits illustrated in FIGS. 18 & 20. The additional functionality provided by the multiplexer 1812 coupling the FIG. 18 data receiver circuit 1800 and FIG. 20 strobe receiver circuit 2000 is the ability to associate a data receiver circuit 1800 with two or more different strobe receiver circuits 2000. In this manner, the receipt of data at some of a memory controller's data pads may be controlled by one of a plurality of different strobes, and functionality such as the ability to read from DIMMs comprised of ×4, ×8 and ×16 DDR SDRAMs is provided.

In FIG. 18, the receipt of data at data pad DQ4 may be controlled in response to a strobe received at strobe pad DQS18, or a strobe received at an alternate strobe pad. Referring to the associations of data and strobe pads provided in FIG. 10, one can appreciate that a read from a DIMM comprised of ×4 DDR SDRAMs requires an association between data pad DQ4 and strobe pad DQS18, while a read from a DIMM comprised of ×8 or ×16 DDR SDRAMs requires an association between data pad DQ4 and strobe pad DQS18. Thus, the strobe edge count comprised of bits S1_alt–S4_alt in FIG. 18 is a count of strobe edges produced at strobe pad DQS18.

When extrapolating the circuitry 1800, 2000 illustrated in FIGS. 18 & 20 to a larger scale, one skilled in the art will realize that the FIG. 9 memory controller 100 is provided with an ability to read DIMMs 104 comprised of non-homogeneous DDR SDRAMs by 1) providing a fixed correlation between a first half of the memory controller's data pads (DQ0–DQ3, DQ8–DQ11, DQ16–19, . . . ) and the memory controller's lower strobe pads (DQS0–DQS17), and 2) providing a programmable correlation between a second half of the memory controller's data pads (DQ4–DQ7, DQ12–DQ15, DQ20–23, . . . ) and the memory controller's upper (DQS18–DQS35) and lower (DQS0–DQS17) strobe pads. In the latter case, the programmable correlation is determined by control circuitry comprising, for example, a plurality of multiplexers 1812 which receive addressed values of $A_x$ (appearing in FIG. 18 as signal set_alt_n) from the memory map 1100. If an addressed value $A_x$ is a logic "1", then the data and strobe pads will be associated in a manner which allows for reading data from DIMMs comprised of ×4 DDR SDRAMs (i.e., a count (bits S1–S4) which is received at the multiplexer's first data input will be passed through the multiplexer 1812). If an addressed value $A_x$ is a logic "0", then the data and strobe pads will be associated in a manner which allows for reading data from DIMMs comprised of ×8 or ×16 DDR SDRAMs (i.e., a count (bits S1_alt–S4_alt) which is received at the multiplexer's second data input will be passed through the multiplexer 1812).

In a preferred embodiment, the critical signal for controlling the multiplexer 1812 is the set_alt_n signal. A possible derivation of this signal is illustrated in FIG. 28. After reset_L is briefly driven low during system reset, reset_L is held high. The selection of a primary or alternate strobe edge count for the purpose of controlling data input latches 1802–1808 is therefore determined by the signals read_tri and read_tri_x4. During a read of a DIMM comprised of ×4 DDR SDRAMs, both read_tri and read_tri_x4 are asserted, and multiplexer 2800, OR gate 2802, and D-type flip-flops 2804 and 2806 assert the signal set_alt_n. However, during a read of a DIMM comprised of ×8 or ×16 DDR SDRAMs, read_tri_x4 is deasserted to thereby deassert the set_alt_n signal. In this manner the FIG. 9 memory controller may be configured to read data from DIMMs comprised of ×4, ×8 and ×16 DDR SDRAMs. The read_tri_x4 signal may be, for example, an addressed value $A_x$ or a derivative thereof.

Although the memory controller 100 which is described above is capable of communicating with DIMMs 104 comprised of DDR SDRAMs having two different data/strobe ratios (i.e., 4:1 and 8:1 ratios), the teachings provided herein may be adapted to provide even greater flexibility for reading from memory modules 104 comprised of non-homogeneous data width RAM devices. For example, the control circuitry 1810, 1812, 2800–2806 for associating data and strobe driver circuits 1800, 2000 may comprise multiplexers which receive data based on strobes received at more than two strobe pads (e.g., strobe edge counts based on strobes received at more than two strobe pads). Furthermore, the subset of a memory controller's data pads which have a fixed correlation with ones of the memory controller's strobe pads may be greater, smaller, or even non-existent.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. Memory controller driver circuitry comprising:
  a) a data pad;
  b) N data propagation circuits (N≧2);
  c) a multiplexing stage which provides data to at least N−1 of the N data propagation circuits, said multiplexing stage enabling a coupling of a first data input stream to each of the N data propagation circuits when the multiplexing stage is configured in a 1x mode, and said multiplexing stage enabling a coupling of different data input streams to various of the N data propagation circuits when the multiplexing stage is configured in an Mx mode (1<M≦N);
  d) output merging circuitry which alternately couples the N data propagation circuits to the data pad to thereby generate either a 1x or Mx stream of data bits at the data pad;
  e) a phase delay circuit;
  f) a first phase delay multiplexer which enables a coupling of said first data input stream to the phase delay circuit when the first phase delay multiplexer is configured in a 1x mode, and which enables a coupling of an Nth data input stream to the phase delay circuit when the first phase delay multiplexer is configured in an Nx mode; and
  g) a second phase delay multiplexer which couples an output of a first of the N data propagation circuits, an output of the phase delay circuit, and an input of the output merging circuitry, said second phase delay multiplexer coupling said output of the first of the N data propagation circuits to said output merging circuitry when said second phase delay multiplexer is configured for no write phase delay, and said second phase delay multiplexer coupling said output of the phase delay circuit to said output merging circuitry when said second phase delay multiplexer is configured for a write phase delay.

2. Memory controller driver circuitry comprising:
 a) a data pad;
 b) a strobe pad;
 c) two data propagation circuits;
 d) a multiplexing stage which provides data to at least one of the two data propagation circuits, said multiplexing stage enabling a coupling of a first data input stream to each of the two data propagation circuits when the multiplexing stage is configured in a 1x mode, and said multiplexing stage enabling a coupling of different data input streams to the two data propagation circuits when the multiplexing stage is configured in a 2x mode;
 e) output merging circuitry which alternately couples the two data propagation circuits to the data pad to thereby generate either a 1x or 2x stream of data bits at the data pad; and
 f) circuitry for producing at said strobe pad a 1x or 2x strobe signal which corresponds to said 1x or 2x stream of data bits generated at the data pad, the circuitry comprising:
  i) two strobe propagation circuits;
  ii) combinational logic for toggling inputs to the two strobe propagation circuits at a 1x rate when operating in 1x mode, and for respectively driving inputs to the two strobe propagation circuits high and low when operating in 2x mode; and
  iii) strobe merging circuitry which alternately couples the two strobe propagation circuits to the strobe pad to thereby generate either a 1x or 2x strobe signal at the strobe pad.

3. Memory controller driver circuitry as in claim 2, further comprising:
 a) a phase delay circuit;
 b) a first phase delay multiplexer which enables a coupling of said first data input stream to the phase delay circuit when the first phase delay multiplexer is configured in a 1x mode, and which enables a coupling of a second data input stream to the phase delay circuit when the first phase delay multiplexer is configured in a 2x mode; and
 c) a second phase delay multiplexer which couples an output of a first of the two data propagation circuits, an output of the phase delay circuit, and an input of the output merging circuitry, said second phase delay multiplexer coupling said output of the first of the two data propagation circuits to said output merging circuitry when said second phase delay multiplexer is configured for no write phase delay, and said second phase delay multiplexer coupling said output of the phase delay circuit to said output merging circuitry when said second phase delay multiplexer is configured for a write phase delay.

4. Memory controller driver circuitry as in claim 3, wherein a 1x/2x mode signal serves as a control for said first phase delay multiplexer, said memory controller driver circuitry further comprising:
 a) an AND gate which produces a control for said multiplexing stage, said AND gate receiving said 1x/2x mode signal and a write phase delay signal at its inputs; and
 b) an XOR gate which produces a control signal for said second phase delay multiplexer, said XOR gate receiving said 1x/2x mode signal and said write phase delay signal at its inputs.

5. Memory controller driver circuitry as in claim 4, further comprising:
 a) a strobe pad; and
 b) circuitry for producing at said strobe pad a 1x or 2x strobe signal which corresponds to said 1x or 2x stream of data bits generated at the data pad, the circuitry comprising:
  i) two strobe propagation circuits;
  ii) combinational logic for toggling inputs to the two strobe propagation circuits at a 1x rate when operating in 1x mode, and for respectively driving inputs to the two strobe propagation circuits high and low when operating in 2x mode; and
  iii) strobe merging circuitry which alternately couples the two strobe propagation circuits to the strobe pad to thereby generate either a 1x or 2x strobe signal at the strobe pad.

6. A computer system comprising:
 a) a CPU;
 b) a memory controller coupled to said CPU;
 c) an I/O controller coupled to said CPU;
 d) a number of I/O devices coupled to said I/O controller; and
 e) a number of memory modules coupled to said memory controller;
 wherein said memory controller comprises a plurality of data pads to which is coupled data driver circuitry for driving data to said memory modules, and a plurality of strobe pads to which is coupled strobe driver circuitry for driving strobes to said memory modules;
 wherein said data driver circuitry comprises, for each data pad:
  i) two data propagation circuits;
  ii) a multiplexing stage which provides data to at least one of the two data propagation circuits, said multiplexing stage enabling a coupling of a first data input stream to each of the two data propagation circuits when the multiplexing stage is configured in a 1x mode, and said multiplexing stage enabling a coupling of different data input streams to various of the two data propagation circuits when the multiplexing stage is configured in a 2x mode; and
  iii) output merging circuitry which alternately couples the two data propagation circuits to the data pad to thereby generate either a 1x or 2x stream of data bits at the data pad; and
 wherein said strobe driver circuitry comprising circuitry for producing at said strobe pads 1x or 2x strobe signal which corresponds to said 1x or 2x streams of data bits generated at said data pads, the circuitry comprising for each strobe pad:
  i) two strobe propagation circuits;
  ii) combinational logic for toggling inputs to the two strobe propagation circuits at a 1x rate when operating in 1x mode, and for respectively driving inputs to the two strobe propagation circuits high and low when operating in 2x mode; and
  iii) strobe merging circuitry which alternately couples the two strobe propagation circuits to the strobe pad to thereby generate either a 1x or 2x strobe signal at the strobe pad.

* * * * *